US012241376B1

(12) United States Patent
Snyder et al.

(10) Patent No.: US 12,241,376 B1

(45) Date of Patent: Mar. 4, 2025

(54) LOCATING PLATE FOR USE WITH TURBINE SHROUD ASSEMBLIES

(71) Applicant: Rolls-Royce Corporation, Indianapolis, IN (US)

(72) Inventors: Clark Snyder, Indianapolis, IN (US); David J. Thomas, Indianapolis, IN (US); Ted J. Freeman, Indianapolis, IN (US); Aaron D. Sippel, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/528,720

(22) Filed: Dec. 4, 2023

(51) Int. Cl.
*F01D 11/08* (2006.01)
*F01D 9/04* (2006.01)
*F01D 25/24* (2006.01)

(52) U.S. Cl.
CPC .............. *F01D 11/08* (2013.01); *F01D 9/042* (2013.01); *F01D 25/246* (2013.01); *F05D 2220/32* (2013.01); *F05D 2230/60* (2013.01); *F05D 2240/12* (2013.01); *F05D 2240/14* (2013.01)

(58) Field of Classification Search
CPC ..... F01D 9/00; F01D 9/02; F01D 9/04; F01D 9/041; F01D 9/042; F01D 11/08; F01D 11/12; F01D 11/122; F01D 25/24; F01D 25/246; F05D 2260/30; F05D 2230/60; F05D 2220/32; F05D 2240/12
See application file for complete search history.

(56) References Cited

U.S. PATENT DOCUMENTS

| | | | | |
|---|---|---|---|---|
| 3,066,911 A * | 12/1962 | Anderson | ............. F01D 25/246 415/138 |
| 7,207,771 B2 | 4/2007 | Synnott et al. | |
| 7,217,089 B2 | 5/2007 | Durocher et al. | |
| 7,374,395 B2 | 5/2008 | Durocher et al. | |
| 7,513,740 B1 | 4/2009 | Hervy et al. | |
| 7,600,967 B2 | 10/2009 | Pezzetti, Jr. et al. | |
| 7,771,159 B2 | 8/2010 | Johnson et al. | |
| 7,901,186 B2 | 3/2011 | Cornett et al. | |
| 8,206,087 B2 | 6/2012 | Campbell et al. | |
| 8,303,245 B2 | 11/2012 | Foster et al. | |
| 8,641,371 B2 | 2/2014 | Nakamura et al. | |
| 8,651,497 B2 | 2/2014 | Tholen et al. | |
| 8,684,680 B2 | 4/2014 | Martin et al. | |
| 8,784,041 B2 | 7/2014 | Durocher et al. | |

(Continued)

FOREIGN PATENT DOCUMENTS

| | | |
|---|---|---|
| EP | 1965031 A2 | 9/2008 |
| EP | 3543468 A1 | 9/2019 |
| FR | 3056636 A1 | 3/2018 |

*Primary Examiner* — Elton K Wong

(74) *Attorney, Agent, or Firm* — Barnes & Thornburg LLP

(57) ABSTRACT

A turbine assembly includes a turbine case, a turbine shroud assembly including a carrier segment, and a locating plate. The locating plate is coupled with the turbine case axially forward of the carrier segment to block axially forward movement of the carrier segment and prevent separation of the carrier segment from the turbine case. The locating plate includes a main wall, a raised portion extending upwardly a first radial distance, and two circumferentially spaced apart extensions extending upwardly a second radial distance. The second radial distance is greater than the first radial distance such that, in a first arrangement, only the extensions contact the turbine case and such that, in a second arrangement, the raised portion is pulled toward the turbine case via a fastener so as to contact the turbine case in addition to the extensions.

20 Claims, 16 Drawing Sheets

(56) References Cited

U.S. PATENT DOCUMENTS

| | | | |
|---|---|---|---|
| 8,845,285 | B2 | 9/2014 | Weber et al. |
| 8,905,708 | B2 | 12/2014 | Weber et al. |
| 9,079,245 | B2 | 7/2015 | Durocher et al. |
| 9,534,500 | B2 | 1/2017 | Bouchard et al. |
| 9,708,922 | B1 | 7/2017 | Davis et al. |
| 9,714,580 | B2 | 7/2017 | Slavens et al. |
| 9,745,854 | B2 | 8/2017 | Baldiga et al. |
| 9,759,079 | B2 | 9/2017 | Sippel et al. |
| 9,863,265 | B2 | 1/2018 | Stapleton |
| 9,863,323 | B2 | 1/2018 | Kirtley et al. |
| 9,869,201 | B2 | 1/2018 | Dyson et al. |
| 9,874,104 | B2 | 1/2018 | Shapiro |
| 9,915,162 | B2 | 3/2018 | Duguay |
| 9,945,484 | B2 | 4/2018 | Moehrle et al. |
| 9,957,827 | B2 | 5/2018 | Davis et al. |
| 9,982,550 | B2 | 5/2018 | Davis |
| 9,988,919 | B2 | 6/2018 | Davis et al. |
| 9,988,923 | B2 | 6/2018 | Snyder et al. |
| 10,012,099 | B2 | 7/2018 | Cetel et al. |
| 10,024,193 | B2 | 7/2018 | Shapiro |
| 10,072,517 | B2 | 9/2018 | Boeke et al. |
| 10,082,085 | B2 | 9/2018 | Thomas et al. |
| 10,087,771 | B2 | 10/2018 | Mcgarrah |
| 10,100,660 | B2 | 10/2018 | Sippel et al. |
| 10,132,197 | B2 | 11/2018 | Heitman et al. |
| 10,138,747 | B2 | 11/2018 | Dev et al. |
| 10,138,750 | B2 | 11/2018 | Mccaffrey et al. |
| 10,167,957 | B2 | 1/2019 | Davis et al. |
| 10,202,863 | B2 | 2/2019 | Davis et al. |
| 10,265,806 | B2 | 4/2019 | Cui et al. |
| 10,281,045 | B2 | 5/2019 | Sippel et al. |
| 10,301,955 | B2 | 5/2019 | Vetters et al. |
| 10,301,960 | B2 | 5/2019 | Stapleton et al. |
| 10,378,385 | B2 | 8/2019 | Tesson et al. |
| 10,378,386 | B2 | 8/2019 | Roussille et al. |
| 10,415,426 | B2 | 9/2019 | Quennehen et al. |
| 10,415,427 | B2 | 9/2019 | Quennehen et al. |
| 10,422,241 | B2 | 9/2019 | Mccaffrey et al. |
| 10,428,688 | B2 | 10/2019 | Quennehen et al. |
| 10,428,953 | B2 | 10/2019 | Lutjen et al. |
| 10,443,419 | B2 | 10/2019 | Thomas et al. |
| 10,443,420 | B2 | 10/2019 | Sippel et al. |
| 10,465,545 | B2 | 11/2019 | Cetel et al. |
| 10,533,446 | B2 | 1/2020 | Barak et al. |
| 10,550,706 | B2 | 2/2020 | Lutjen et al. |
| 10,577,963 | B2 | 3/2020 | Mccaffrey |
| 10,577,977 | B2 | 3/2020 | Baucco |
| 10,584,605 | B2 | 3/2020 | Sippel et al. |
| 10,590,803 | B2 | 3/2020 | Quennehen et al. |
| 10,598,045 | B2 | 3/2020 | Tableau et al. |
| 10,605,120 | B2 | 3/2020 | Quennehen et al. |
| 10,619,517 | B2 | 4/2020 | Quennehen et al. |
| 10,626,745 | B2 | 4/2020 | Roussille et al. |
| 10,633,994 | B2 | 4/2020 | Barker |
| 10,648,362 | B2 | 5/2020 | Groves, II et al. |
| 10,655,495 | B2 | 5/2020 | Groves, II et al. |
| 10,655,501 | B2 | 5/2020 | Lepretre et al. |
| 10,662,794 | B2 | 5/2020 | Das |
| 10,689,998 | B2 | 6/2020 | Stapleton et al. |
| 10,690,007 | B2 | 6/2020 | Quennehen et al. |
| 10,704,404 | B2 | 7/2020 | Shi et al. |
| 10,718,226 | B2 | 7/2020 | Vetters et al. |
| 10,724,399 | B2 | 7/2020 | Carlin et al. |
| 10,731,494 | B2 | 8/2020 | Dev et al. |
| 10,731,509 | B2 | 8/2020 | Correia et al. |
| 10,738,643 | B2 | 8/2020 | Mccaffrey et al. |
| 10,753,221 | B2 | 8/2020 | Barker et al. |
| 10,787,924 | B2 | 9/2020 | Quennehen et al. |
| 10,794,204 | B2 | 10/2020 | Fitzpatrick et al. |
| 10,801,345 | B2 | 10/2020 | Clum et al. |
| 10,801,349 | B2 | 10/2020 | Mccaffrey |
| 10,815,807 | B2 | 10/2020 | Vantassel et al. |
| 10,815,810 | B2 | 10/2020 | Barker et al. |
| 10,830,357 | B2 | 11/2020 | Mccaffrey et al. |
| 10,890,079 | B2 | 1/2021 | Propheter-Hinckley et al. |
| 10,907,487 | B2 | 2/2021 | Zurmehly et al. |
| 10,907,501 | B2 | 2/2021 | Filippi et al. |
| 10,934,872 | B2 | 3/2021 | Tableau et al. |
| 10,934,873 | B2 | 3/2021 | Sarawate et al. |
| 10,968,761 | B2 | 4/2021 | Barker et al. |
| 10,968,777 | B2 | 4/2021 | Propheter-Hinckley et al. |
| 10,982,559 | B2 | 4/2021 | Filippi |
| 11,002,144 | B2 | 5/2021 | Azad et al. |
| 11,015,613 | B2 | 5/2021 | Kerns et al. |
| 11,021,988 | B2 | 6/2021 | Tableau et al. |
| 11,021,990 | B2 | 6/2021 | Filippi |
| 11,028,720 | B2 | 6/2021 | Tableau et al. |
| 11,041,399 | B2 | 6/2021 | Lutjen et al. |
| 11,047,245 | B2 | 6/2021 | Mccaffrey |
| 11,066,947 | B2 | 7/2021 | Sippel et al. |
| 11,073,045 | B2 | 7/2021 | Sippel et al. |
| 11,078,804 | B2 | 8/2021 | Tableau et al. |
| 11,085,316 | B2 | 8/2021 | Barker et al. |
| 11,085,317 | B2 | 8/2021 | Johnson et al. |
| 11,105,215 | B2 | 8/2021 | Roy Thill et al. |
| 11,111,794 | B2 | 9/2021 | Bitzko et al. |
| 11,111,802 | B2 | 9/2021 | Propheter-Hinckley et al. |
| 11,111,822 | B2 | 9/2021 | Tableau et al. |
| 11,111,823 | B2 | 9/2021 | Jarrossay et al. |
| 11,125,096 | B2 | 9/2021 | Clark et al. |
| 11,125,098 | B2 | 9/2021 | Barker et al. |
| 11,143,050 | B2 | 10/2021 | Roy Thill et al. |
| 11,149,574 | B2 | 10/2021 | Laroche |
| 11,174,747 | B2 | 11/2021 | Roy Thill et al. |
| 11,174,795 | B2 | 11/2021 | Lutjen et al. |
| 11,181,006 | B2 | 11/2021 | Smoke et al. |
| 11,187,094 | B2 | 11/2021 | Feldmann et al. |
| 11,215,064 | B2 | 1/2022 | Arbona et al. |
| 11,215,065 | B2 | 1/2022 | Starr et al. |
| 11,215,081 | B2 | 1/2022 | Schilling et al. |
| 11,248,480 | B2 | 2/2022 | Thirumalai et al. |
| 11,255,208 | B2 | 2/2022 | Clark et al. |
| 11,255,209 | B2 | 2/2022 | Clark et al. |
| 11,286,812 | B1 | 3/2022 | Freeman et al. |
| 11,313,242 | B2 | 4/2022 | Cetel et al. |
| 11,319,827 | B2 | 5/2022 | Clark et al. |
| 11,319,828 | B1 | 5/2022 | Freeman et al. |
| 11,326,463 | B2 | 5/2022 | Blaney et al. |
| 11,326,470 | B2 | 5/2022 | Dyson et al. |
| 11,346,237 | B1 | 5/2022 | Freeman et al. |
| 11,346,251 | B1 | 5/2022 | Freeman et al. |
| 11,365,635 | B2 | 6/2022 | Read et al. |
| 11,441,434 | B2 | 9/2022 | Danis et al. |
| 11,441,441 | B1 | 9/2022 | Freeman et al. |
| 11,466,585 | B2 | 10/2022 | Arbona et al. |
| 11,466,586 | B2 | 10/2022 | Sippel et al. |
| 11,499,444 | B1 | 11/2022 | Freeman et al. |
| 11,506,085 | B2 | 11/2022 | Jarrossay et al. |
| 11,542,825 | B2 | 1/2023 | Hauswirth et al. |
| 11,542,827 | B2 | 1/2023 | Quennehen et al. |
| 11,624,291 | B2 | 4/2023 | Roy Thill et al. |
| 11,624,292 | B2 | 4/2023 | Clark et al. |
| 11,629,607 | B2 | 4/2023 | Freeman et al. |
| 11,643,939 | B2 | 5/2023 | Stoyanov et al. |
| 11,702,948 | B2 | 7/2023 | Hock et al. |
| 11,702,949 | B2 | 7/2023 | Freeman et al. |
| 11,713,694 | B1 | 8/2023 | Freeman et al. |
| 11,732,604 | B1 | 8/2023 | Freeman et al. |
| 11,761,351 | B2 | 9/2023 | Freeman et al. |
| 11,773,751 | B1 | 10/2023 | Freeman et al. |
| 11,781,440 | B2 | 10/2023 | Vincent et al. |
| 11,781,448 | B1 | 10/2023 | Holleran |
| 11,840,930 | B2 | 12/2023 | Propheter-Hinckley et al. |
| 11,840,936 | B1 | 12/2023 | Freeman et al. |
| 11,879,349 | B2 | 1/2024 | Schilling et al. |
| 2011/0293410 | A1* | 12/2011 | Marusko ................. F01D 11/08 415/173.1 |
| 2021/0115806 | A1* | 4/2021 | Tableau .................. F01D 11/08 |
| 2023/0184124 | A1 | 6/2023 | Stoyanov et al. |
| 2023/0332506 | A1 | 10/2023 | Freeman et al. |
| 2024/0003267 | A1 | 1/2024 | Cazin et al. |

* cited by examiner

LOCATING PLATE FOR USE WITH TURBINE SHROUD ASSEMBLIES

FIELD OF DISCLOSURE

The present disclosure relates generally to gas turbine engines, and more specifically to subassemblies of gas turbine engines including ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies.

Some shrouds positioned in the turbine may be exposed to high temperatures from products of the combustion reaction in the combustor. Such shrouds sometimes include blade track components made from ceramic matrix composite materials designed to withstand high temperatures. In some examples, coupling ceramic matrix composite components with traditional arrangements may present problems due to thermal expansion and/or material properties of the ceramic matrix composite components.

SUMMARY

The present disclosure may comprise one or more of the following features and combinations thereof.

A turbine assembly for use with a gas turbine engine according to a first aspect of the present disclosure includes a turbine case arranging circumferentially around an axis, a turbine shroud assembly, and a locating plate. The turbine shroud assembly includes a carrier segment made of metallic materials arranged circumferentially at least partway around the axis and radially inwardly of the turbine case and a blade track segment coupled to the carrier segment, the carrier segment being coupled to the turbine case to define a portion of a gas path of the turbine assembly.

The locating plate is arranged circumferentially at least partway around the axis and coupled with the turbine case axially forward of the carrier segment to block axially forward movement of the carrier segment and prevent separation of the carrier segment from the turbine case, the locating plate including a main wall, a raised portion extending upwardly away from the main wall a first radial distance, a first support extension extending upwardly away from the main wall a second radial distance and a second support extension circumferentially spaced apart from the first support extension and extending upwardly away from the main wall the second radial distance, the first and second support extensions being circumferentially spaced apart from the raised portion.

In some embodiments, the second radial distance is greater than the first radial distance such that, in a first arrangement, the locating plate is arranged such that the first and second support extensions contact the turbine case and the raised portion is spaced apart from the turbine case, and, in a second arrangement, the locating plate is arranged such that the first and second support extensions and the raised portion simultaneously contact the turbine case via a fastener extending through the turbine case and the raised portion so as to dampen vibrations of the locating plate.

In some embodiments, the main wall of the locating plate is flexible so as to allow, in the second arrangement, a raised portion upper surface of the raised portion to be pulled toward the engine case and into contact with a radially inwardly facing surface of the turbine case via tightening of the fastener.

In some embodiments, the locating plate extends partway circumferentially around the axis and the main wall includes a first circumferential side and second circumferential side circumferentially opposite the first circumferential side.

In some embodiments, the first support extension is arranged on the first circumferential side of the main wall of the locating plate and the second support extension arranged on the second circumferential side of the main wall.

In some embodiments, the first and second support extensions are formed as columnar posts extending upwardly away from the main wall of the locating plate.

In some embodiments, the locating plate further includes a third support extension arranged on the first circumferential side of the main wall of the locating plate and a fourth support extension arranged on the second circumferential side of the main wall, and the third and fourth support extensions are formed as columnar posts extending upwardly away from the main wall of the locating plate.

In some embodiments, the first support extension is axially spaced apart from the third support extension and the second support extension is axially spaced apart from the fourth support extension.

In some embodiments, the raised portion is positioned on the main wall upper surface of the main wall of the locating plate circumferentially between the first support extension and the second support extension, and the raised portion is positioned centrally on the main wall of the locating plate relative to a circumferential direction.

In some embodiments, the first and second support extensions are formed as axially extending ledges that extend axially from an axially forward side of the main wall to an axially aft side of the main wall, and the first and second support extensions each include an upper surface extending along a top side of the axially extending ledges from the axially forward side to the axially aft side that matches a contour of the turbine case.

In some embodiments, the turbine assembly further includes a first seal arranged in a first groove formed in the upper surface of the first support extension, and a second seal arranged in a second groove formed in the upper surface of the second support extension.

In some embodiments, in the second arrangement, the locating plate is spaced apart from the carrier segment such that, in response to the carrier segment being forced axially forward, the carrier segment contacts the locating plate and the locating plate prevents further axially forward movement of the carrier segment.

In some embodiments, the carrier segment further includes a first hanger that couples to a first hook arranged on the turbine case, and the locating plate prevents separation of the first hanger from the first hook.

According to a further aspect of the present disclosure, a turbine assembly for use with a gas turbine engine includes a turbine case arranging circumferentially around an axis, a turbine shroud assembly including a carrier segment arranged radially inwardly of the turbine case and coupled to the turbine case, and a locating plate. The locating plate is coupled with the turbine case axially forward of the carrier segment to block axially forward movement of the carrier segment and prevent separation of the carrier segment from the turbine case.

The locating plate includes a main wall, a raised portion extending upwardly away from the main wall, a first support extension extending upwardly away from the main wall a second radial distance and a second support extension circumferentially spaced apart from the first support extension and extending upwardly away from the main wall the second radial distance. The second radial distance is greater than the first radial distance and the first and second support extensions and the raised portion simultaneously contact the turbine case via a fastener extending through the turbine case and the raised portion so as to dampen vibrations of the locating plate.

In some embodiments, the locating plate extends partway circumferentially around the axis and the main wall includes a first circumferential side and second circumferential side circumferentially opposite the first circumferential side.

In some embodiments, the first support extension is arranged on the first circumferential side of the main wall of the locating plate and the second support extension is arranged on the second circumferential side of the main wall.

In some embodiments, the raised portion is positioned on the main wall circumferentially between the first support extension and the second support extension, and the raised portion is positioned centrally on the main wall of the locating plate relative to a circumferential direction.

According to a further aspect of the present disclosure, a method includes arranging a turbine case circumferentially around an axis, arranging a turbine shroud assembly including a carrier segment made of metallic materials circumferentially at least partway around the axis and radially inwardly of the turbine case, coupling a blade track segment to the carrier segment, and coupling the carrier segment to the turbine case.

The method further includes arranging, in a first arrangement, a locating plate with the turbine case axially forward of the carrier segment to block axially forward movement of the carrier segment and prevent separation of the carrier segment from the turbine case, the locating plate including a main wall, a raised portion extending upwardly away from the main wall a first radial distance, a first support extension extending upwardly away from the main wall a second radial distance and a second support extension circumferentially spaced apart from the first support extension and extending upwardly away from the main wall the second radial distance, the first and second support extensions being circumferentially spaced apart from the raised portion. The second radial distance is greater than the first radial distance such that, in the first arrangement, the first and second support extensions contact the turbine case and the raised portion is spaced apart from the turbine case. The method further includes coupling, in a second arrangement, the locating plate to the turbine case such that the first and second support extensions and the raised portion simultaneously contact the turbine case via a fastener extending through the turbine case and the raised portion so as to dampen vibrations of the locating plate.

In some embodiments, the main wall of the locating plate is flexible so as to allow, in the second arrangement, a raised portion upper surface of the raised portion to be pulled toward the engine case and into contact with a radially inwardly facing surface of the turbine case via tightening of the fastener.

In some embodiments, the locating plate extends partway circumferentially around the axis and the main wall includes a first circumferential side and second circumferential side circumferentially opposite the first circumferential side, the first support extension is arranged on the first circumferential side of the main wall of the locating plate and the second support extension arranged on the second circumferential side of the main wall, and the first and second support extensions are formed as columnar posts extending upwardly away from the main wall of the locating plate.

In some embodiments, the locating plate further includes a third support extension arranged on the first circumferential side of the main wall of the locating plate and a fourth support extension arranged on the second circumferential side of the main wall, the third and fourth support extensions are formed as columnar posts extending upwardly away from the main wall of the locating plate.

These and other features of the present disclosure will become more apparent from the following description of the illustrative embodiments.

DETAILED DESCRIPTION OF THE DRAWINGS

Figure 1:
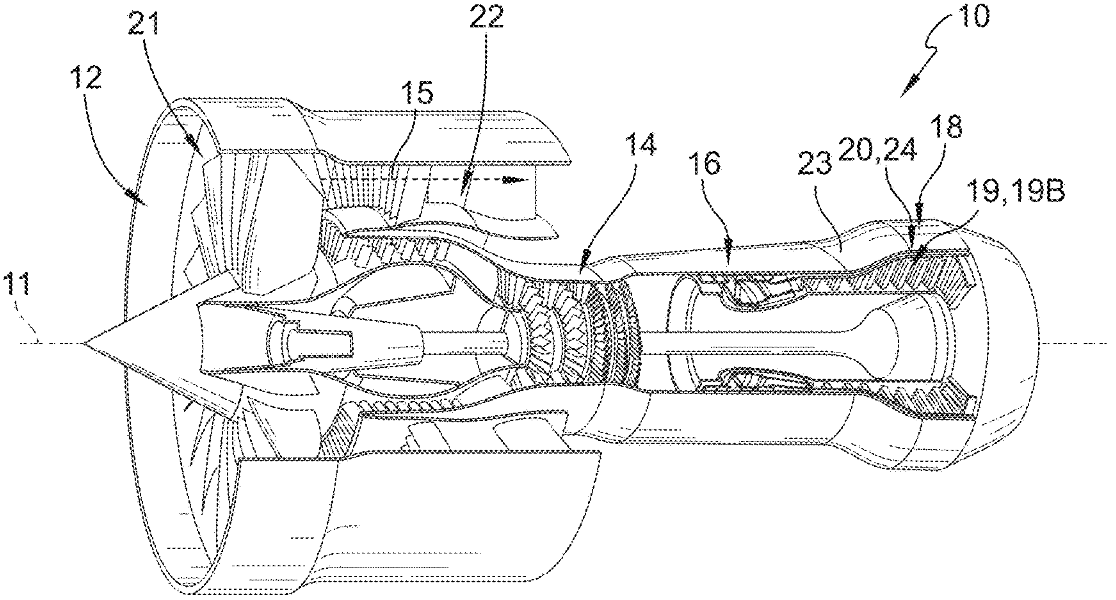
FIG. 1 is a cut-away perspective view of a gas turbine engine showing that the exemplary engine includes a fan, a compressor, a combustor, and a turbine and suggesting that the turbine includes turbine wheel assemblies and static vane assemblies surrounded by a turbine assembly.

For the purposes of promoting an understanding of the principles of the disclosure, reference will now be made to a number of illustrative embodiments illustrated in the drawings and specific language will be used to describe the same.

Figure 8:
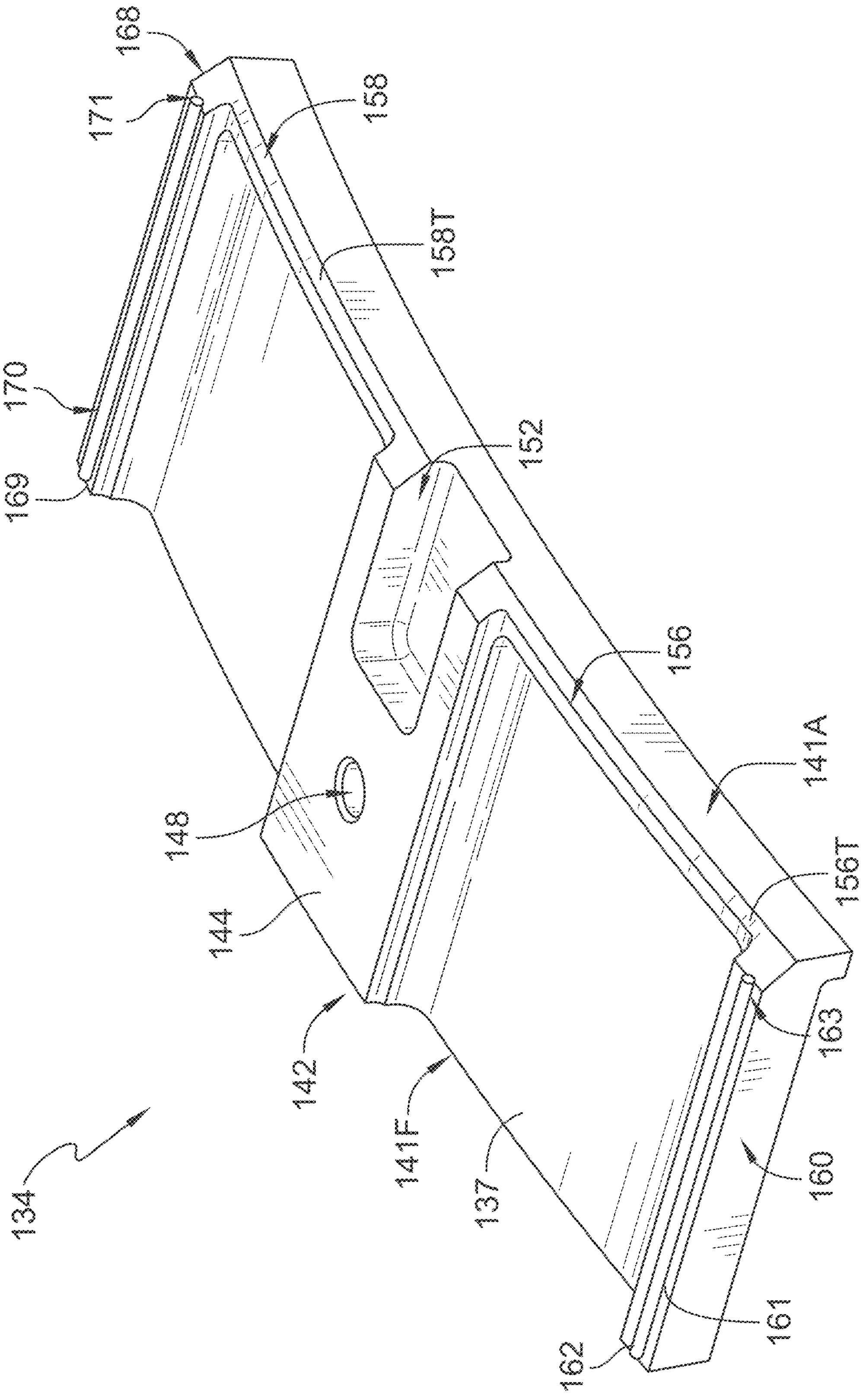
FIG. 8 is a perspective view of a locating plate of a turbine shroud assembly according to a further aspect of the present disclosure, showing that the locating plate includes a main wall having a main wall upper surface, a raised portion extending upwardly away from the main wall upper surface, and two support extensions extending upwardly away from the main wall upper surface, and showing that two seals are arranged on the upper surface of each support extension.

A turbine assembly 24 according to a first aspect of the present disclosure is shown in FIGS. 2A-7C. A turbine assembly 124 according to a further aspect of the present disclosure is shown in FIGS. 8-9D. A turbine assembly 224 according to an additional aspect of the present disclosure is shown in FIGS. 10-15B.

An illustrative aerospace gas turbine engine 10 includes an inlet 12 and an engine core 13, the engine core 13 having a compressor 14, a combustor 16 located downstream of the compressor 14, and a turbine 18 located downstream of the combustor 16 as shown in FIG. 1. A fan 21 arranged in the inlet is driven by the turbine 18 and provides thrust for propelling the gas turbine engine 10 by forcing air 15 through a bypass duct 22. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 21.

The turbine 18 includes at least one turbine wheel assembly 19 and a turbine shroud 20 positioned to surround the turbine wheel assembly 19 as shown in FIG. 1. The turbine wheel assembly 19 includes a plurality of blades 19B. The hot, high pressure combustion products from the combustor 16 are directed toward the blades 19B of the turbine wheel assemblies 19. The turbine shroud 20 is coupled to a turbine case 23 of the gas turbine engine 10 and extends around the turbine wheel assembly 19 to block gases from passing over the turbine blades 19B during use of the turbine section 18 in the gas turbine engine 10.

The turbine assembly 24 is adapted for use in the gas turbine engine 10 of FIG. 1, in particular as a segment of the turbine shroud 20 of the turbine 18. Illustratively, the turbine assembly 24 includes the turbine case 23, a turbine shroud assembly 25 having a carrier segment 26 and a blade track segment, and a locating plate 34 arranged axially forward of the carrier segment 26. The locating plate 34 is configured to be coupled to the turbine case 23 so as to block axially forward movement of the carrier segment 26, prevent separation of the carrier segment 26 from the turbine case 23, and dampen vibrations of the locating plate 34.

Figure 2A:
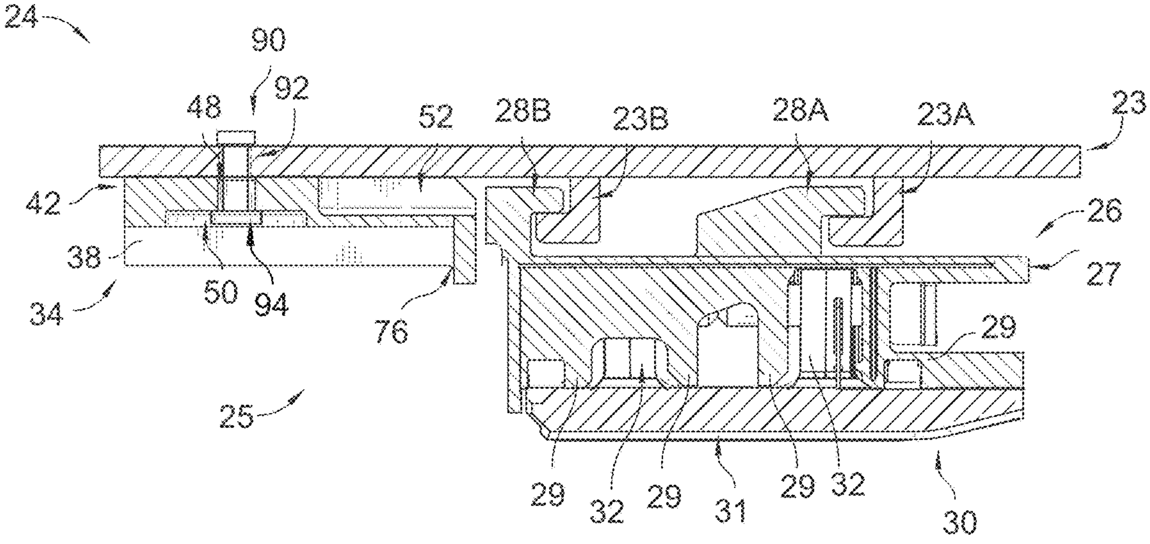
FIG. 2A is a side cross-sectional view of the turbine assembly of FIG. 1, showing a locating plate and a carrier segment of the turbine assembly coupled to a turbine case of the turbine assembly and the locating plate located axially forward of the carrier segment so as to block axially forward movement of the carrier segment.
Figure 2B:
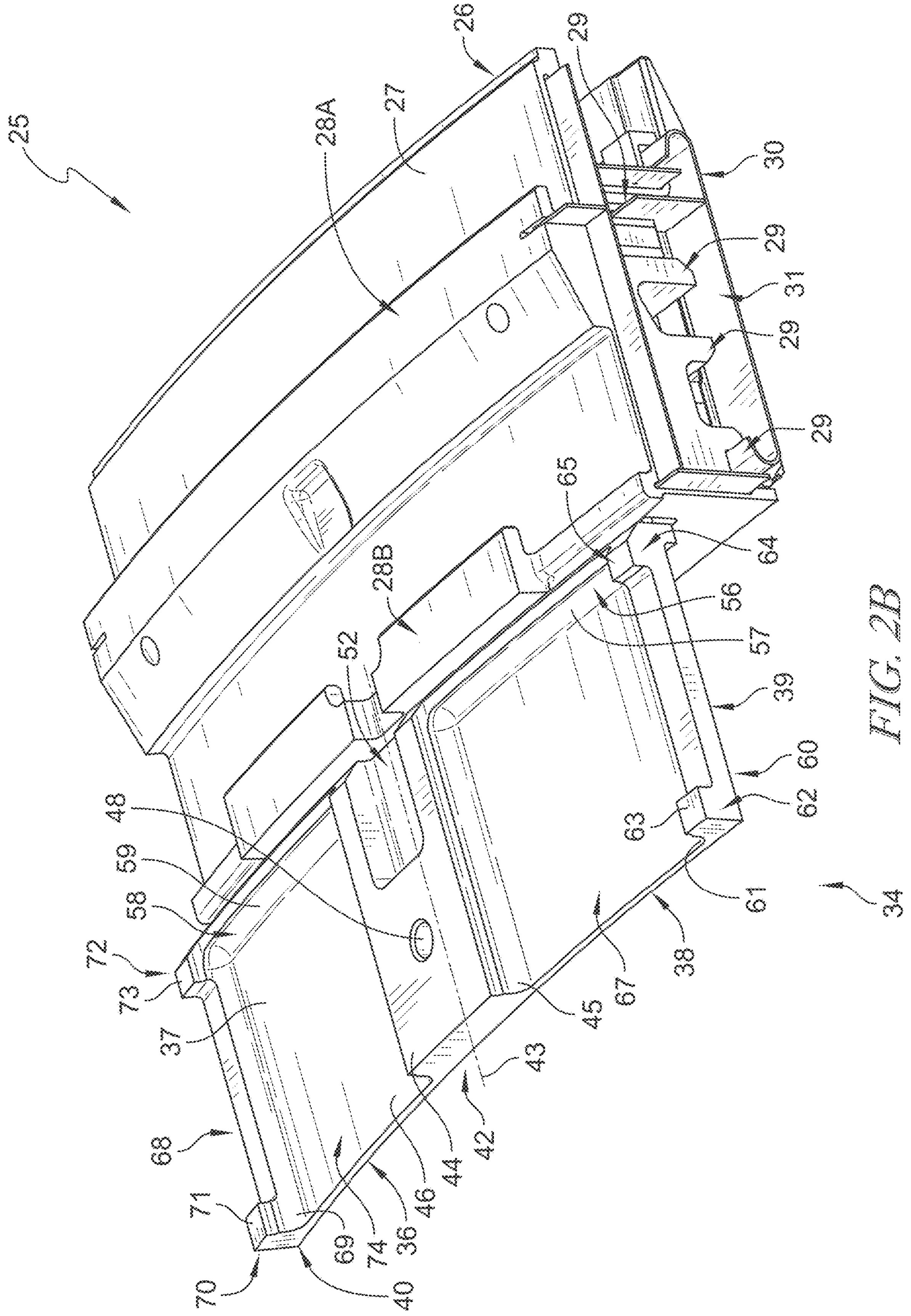
FIG. 2B is a perspective view of the locating plate and the carrier segment of the turbine assembly of FIG. 2A, showing that the locating plate includes a main wall, a raised portion extending upwardly away from the main wall a first radial distance, and multiple support extensions extending upwardly away from the main wall a second radial distance.

As shown in FIGS. 2A and 2B, the turbine assembly 24 includes the carrier segment 26. Illustratively, the carrier segment 26 is a segmented portion of the turbine shroud 20 of the turbine 18, although a person skilled in the art will understand that a full hoop carrier may be utilized including the same components of the carrier segment 26 described herein.

The carrier segment 26 includes an outer wall 27 arranged circumferentially at least partway around the axis 11 of the gas turbine engine 10. The outer wall 27 may be curved about the axis 11 so as to define a first radius of curvature of the outer wall 27. The outer wall 27 may include two hangers 28A, 28B extending radially outwardly for coupling the carrier segment 26 to the turbine case 23. In some embodiments, the carrier segment 26 further includes a plurality of flanges 29 extending radially inwardly.

As can be seen in FIG. 2A, a first hanger 28A of the carrier segment 26 may be coupled to a first hook 23A of the turbine case 23, and a second hanger 28B may be coupled to a second hook 23B of the turbine case 23. The first hanger 28A is located axially aft of and spaced apart from the second hanger 28B. Similarly, the first hook 23A is located axially aft of and spaced apart from the second hook 23B. Each hanger 28A, 28B and each hook 23A, 23B may extend in the circumferential direction as well, and may extend equal lengths in this direction.

Illustratively, the carrier segment 26 further includes a blade track segment 30 arranged circumferentially at least partway around the axis 11 of the gas turbine engine 10, although a person skilled in the art will understand that a full hoop blade track may be utilized including the same components of the blade track segment 30 described herein. The blade track segment 30 may be a ceramic matrix composite component configured to directly face the high temperatures of the gases flowing through the gas turbine engine 10. The carrier segment 26 may be a metallic support component configured to interface with other metallic components of the gas turbine engine 10 to support the blade track segment 30 to radially locate the bladed track segment 30 relative to the axis 11.

During operation of the gas turbine engine 10, the hot, high-pressure products directed into the turbine 18 from the combustor 16 flow across a shroud wall 31 of the blade track segment 30. The hot gases flowing across the shroud wall 31 heat the blade track segment 30, which may transfer heat to retainers (not shown) that couple the blade track segment 30 to the carrier segment 26. The shroud wall 31 may define a portion of a gas path of the turbine assembly 24.

In the illustrative embodiment, the turbine shroud 20 is made up of a number of turbine assemblies 24, including the carrier segment 26 and the locating plate 34 described in detail below, that each extend circumferentially partway around the axis 11 and cooperate to surround the turbine wheel assembly 19. In other embodiments, the turbine shroud 20 is annular and non-segmented to extend fully around the axis 11 and surround the turbine wheel assembly 19. In yet other embodiments, certain components of the turbine shroud 20 are segmented while other components are annular and non-segmented.

Each turbine assembly 24 further includes the locating plate 34, as shown in FIGS. 2A-7C. Illustratively, the locating plate 34 is a segmented portion of the turbine shroud 20 of the turbine 18 and is arranged circumferentially at least partway around the axis 11. A person skilled in the art will understand that a full hoop locating plate may be utilized including the same components of the locating plate 34 described herein.

The locating plate 34 is arranged axially forward of the carrier segment 26 and includes a main wall 36 that may be curved about the axis 11 so as to define a second radius of curvature of the main wall 36, as shown in FIGS. 2B-3B. In some embodiments, the first radius of curvature of the outer wall 27 of the carrier segment 26 is equal to the second radius of curvature of the main wall 36. In some embodiments, the first and second radii of curvature of the outer wall 27 and the main wall 36 are equal to a third radius of curvature of the turbine case 23.

Illustratively, the main wall 36 extends further in the circumferential direction than the axial direction, and has a relatively small thickness as measured in the radial direction. As can be seen in FIGS. 2B-3B, the main wall 36 includes a main wall upper surface 37 and a main wall bottom surface 38 opposite the main wall upper surface 37. The main wall 36 further includes a first circumferential side 39 and a second circumferential side 40 opposite the first circumferential side 39.

As shown in detail in FIGS. 2A-5A, 6A, 7A, and 7B, the locating plate 34 further includes a raised portion 42 extending upwardly away from the main wall upper surface 37. A person skilled in the art will understand that the usage of the terms "upwardly" or "downwardly" herein correspond to radially outwardly and radially inwardly, respectively, unless otherwise noted. The raised portion 42 may be generally rectangular and be located centrally along a circumferential extent of the main wall 36. In some embodiments, the main wall 36 may be divided in half by a central, axially extending axis 43, and the raised portion 42 may be arranged exactly centrally on the axis 43, as shown in FIG. 2B.

Figure 3A:
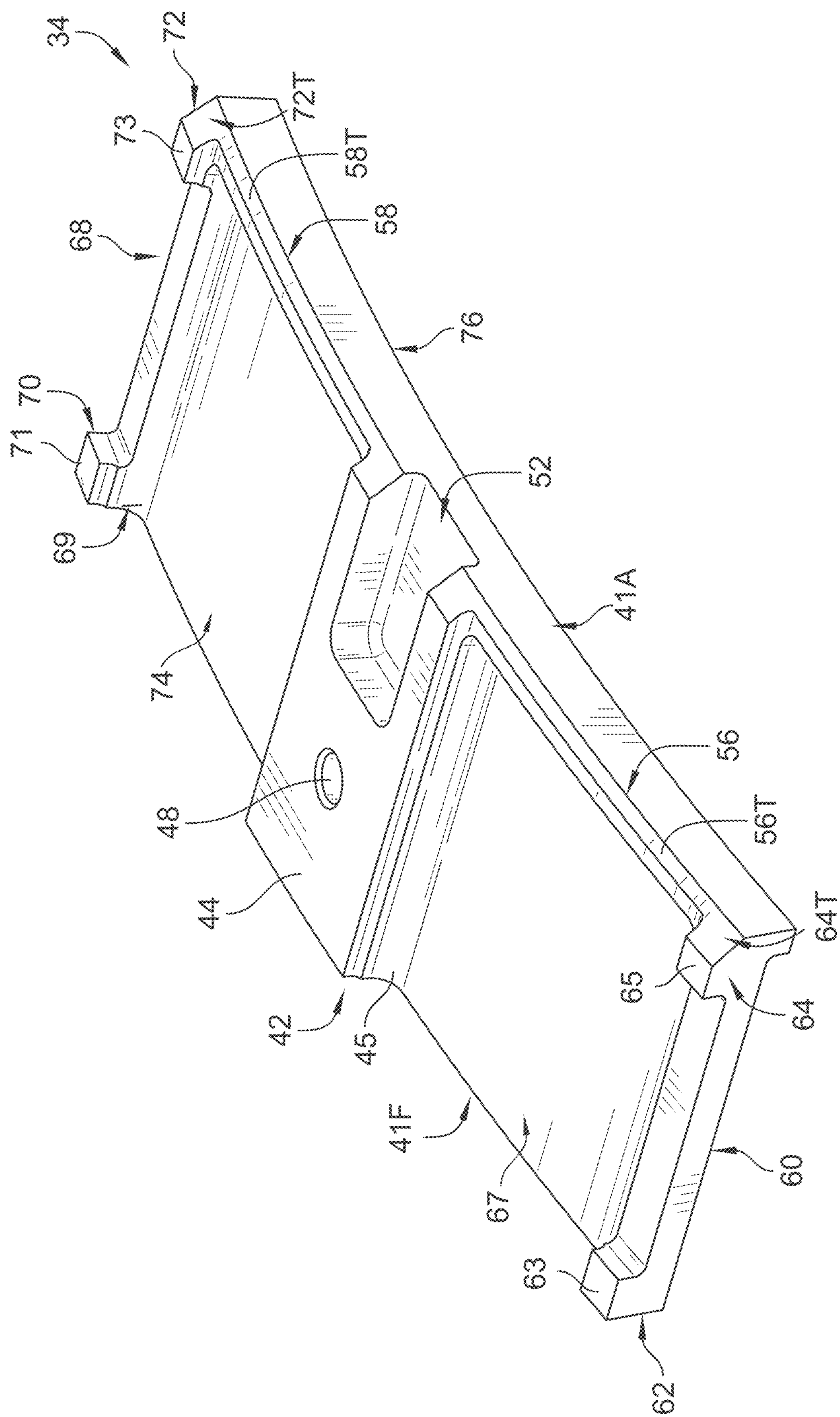
FIG. 3A is a front perspective view of the locating plate of the turbine shroud assembly of FIGS. 2A and 2B, showing that the locating plate includes four support extensions extending upwardly away from four corners of the main wall of the locating plate, and showing that the raised portion is located centrally in a circumferentially direction relative to the four support extensions.
Figure 3B:
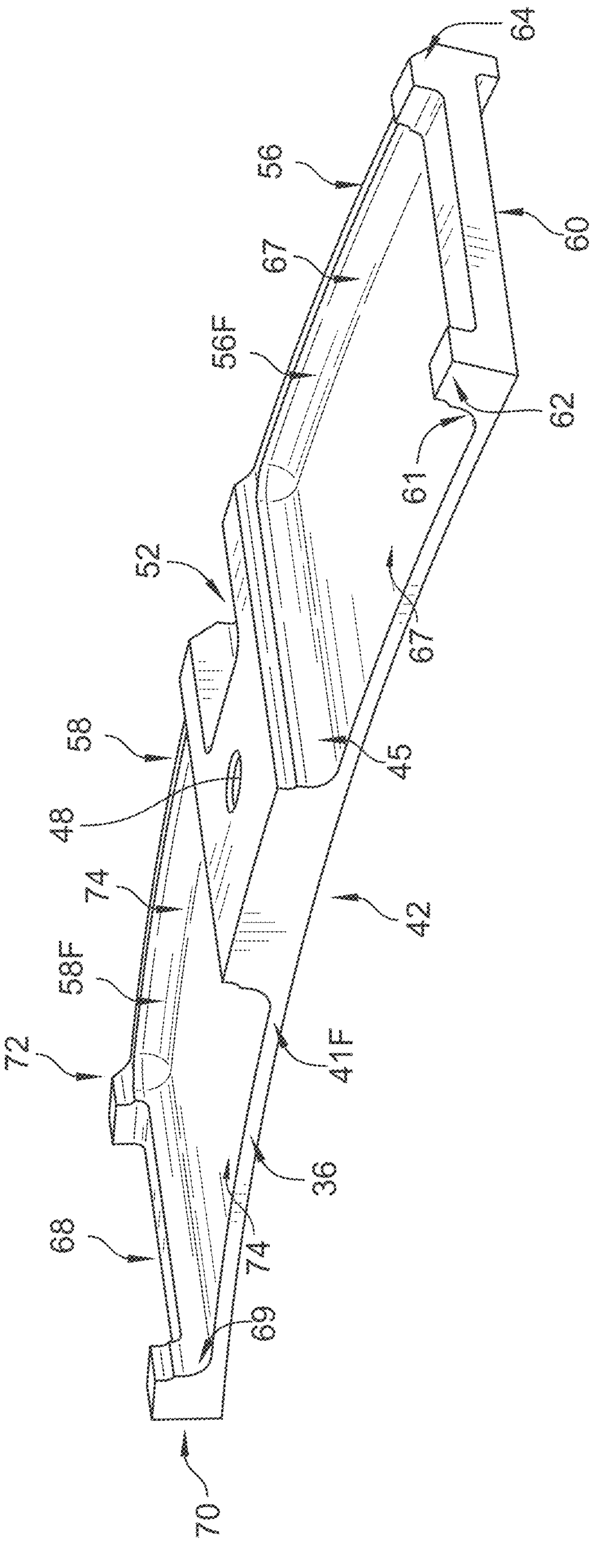
FIG. 3B is an aft perspective view of the locating plate of the turbine shroud assembly of FIG. 3A, showing that the locating plate includes the four support extensions and the raised portion being located centrally in a circumferentially direction relative to the four support extensions.
Figure 4A:
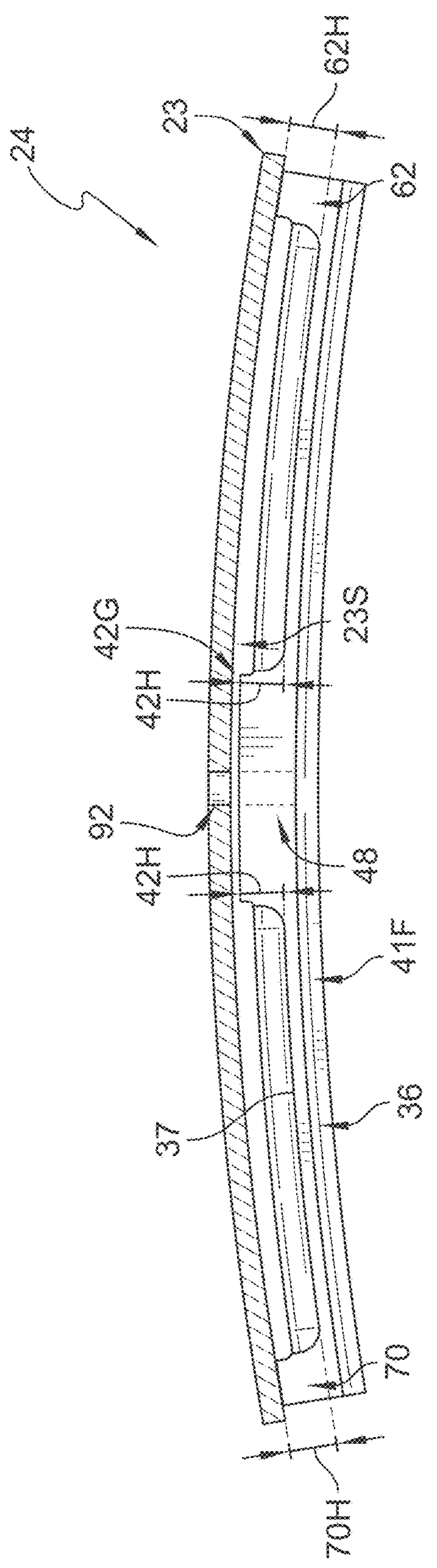
FIG. 4A is a front view of the locating plate of the turbine shroud assembly of FIG. 2A prior to coupling to the turbine case via the fastener, showing the four support extensions in contact with a radially inwardly facing surface of the turbine case and showing the raised portion slightly spaced apart from the radially inwardly facing surface of the turbine case.
Figure 4B:
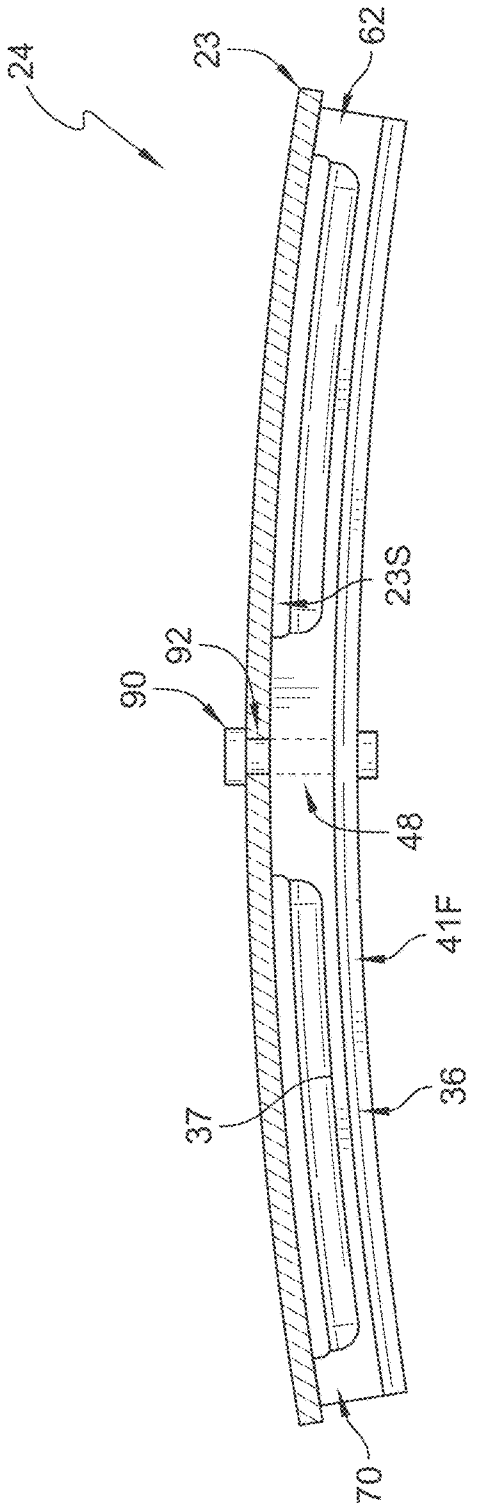
FIG. 4B is a front view of the locating plate of the turbine shroud assembly of FIG. 2A after coupling to the turbine case via the fastener, showing the four support extensions in contact with the radially inwardly facing surface of the turbine case and showing the raised portion in contact with the radially inwardly facing surface of the turbine case due tightening of the fastener.

The raised portion 42 may define a raised portion upper surface 44 that is curved so as to define a fourth radius of curvature, as can be seen in detail in FIGS. 4A and 4B. In some embodiments, the fourth radius of curvature of the raised portion upper surface 44 is equal to the first, second, and third radii of curvatures of the outer wall 27, the main wall 36, and the turbine case 23. The raised portion 42 may include fillets 45, 46 on opposing circumferential sides that extend from the opposing circumferential sides to the main wall upper surface 37, as can be seen in FIGS. 2B-3B.

The raised portion 42 may further include a hole 48 extending radially therethrough, as shown in FIGS. 2B, 3A-6B, and 7C. In some embodiments, the hole 48 may extend entirely through the raised portion 42 and entirely through the main wall 36 continuously. Illustratively, as shown specifically in FIGS. 5B, 6B, and 7C, the main wall 36 includes a circular recess 50 formed therein that opens to the main wall bottom surface 38. The hole 48 may open into the circular recess 50, and in some embodiments, the diameter of the hole 48 is smaller than the diameter of the circular recess 50.

Figure 5B:
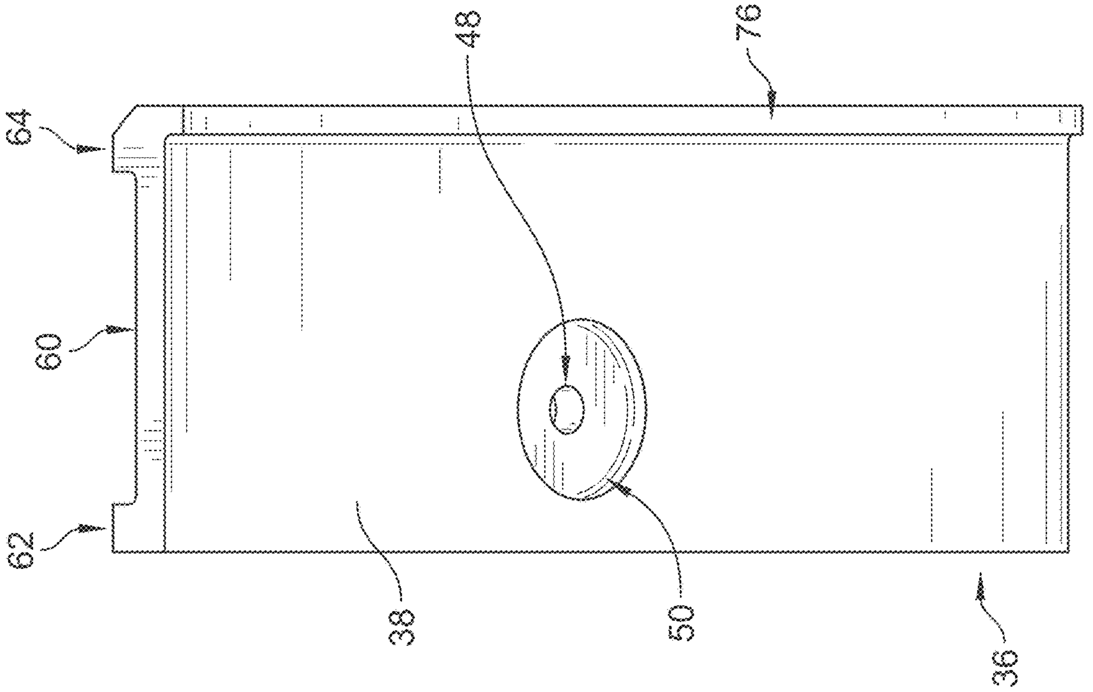
FIG. 5B is a side perspective view of the locating plate of the turbine shroud assembly of FIG. 2A, showing a recess formed in a lower surface of the main wall of the locating plate through which a hole is formed, the hole being configured to receive the fastener.
Figure 5A:
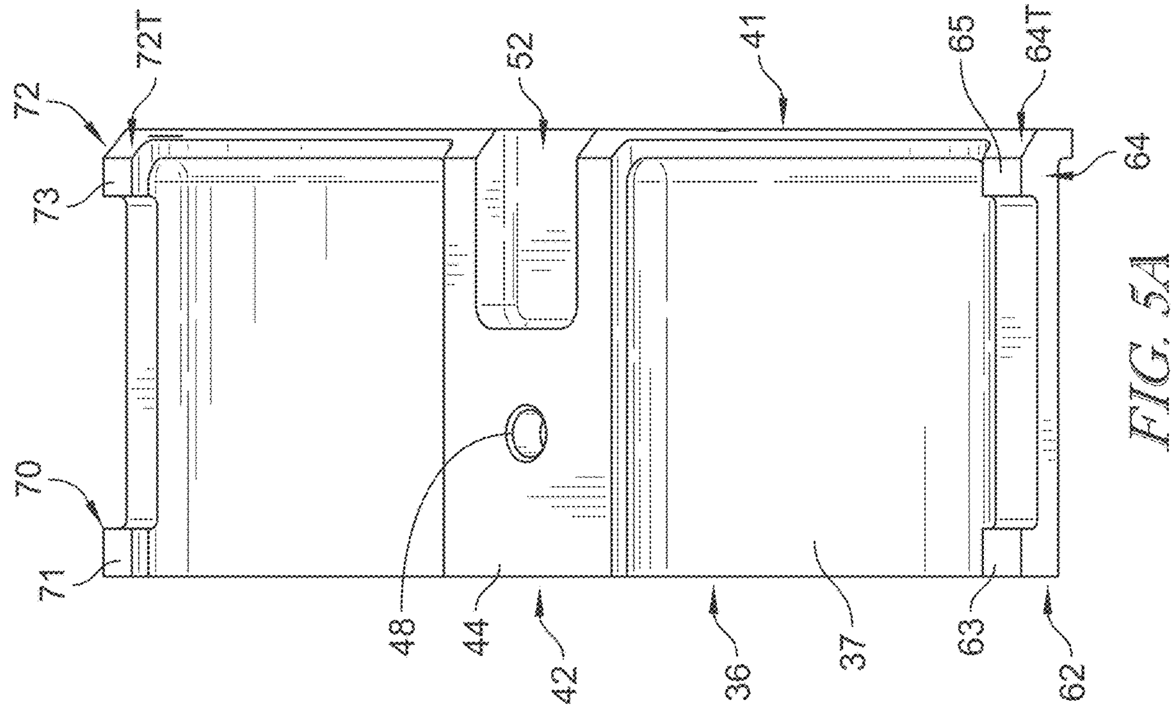
FIG. 5A is a side perspective view of the locating plate of the turbine shroud assembly of FIG. 2A, showing a recess formed in the raised portion.
Figure 6A:
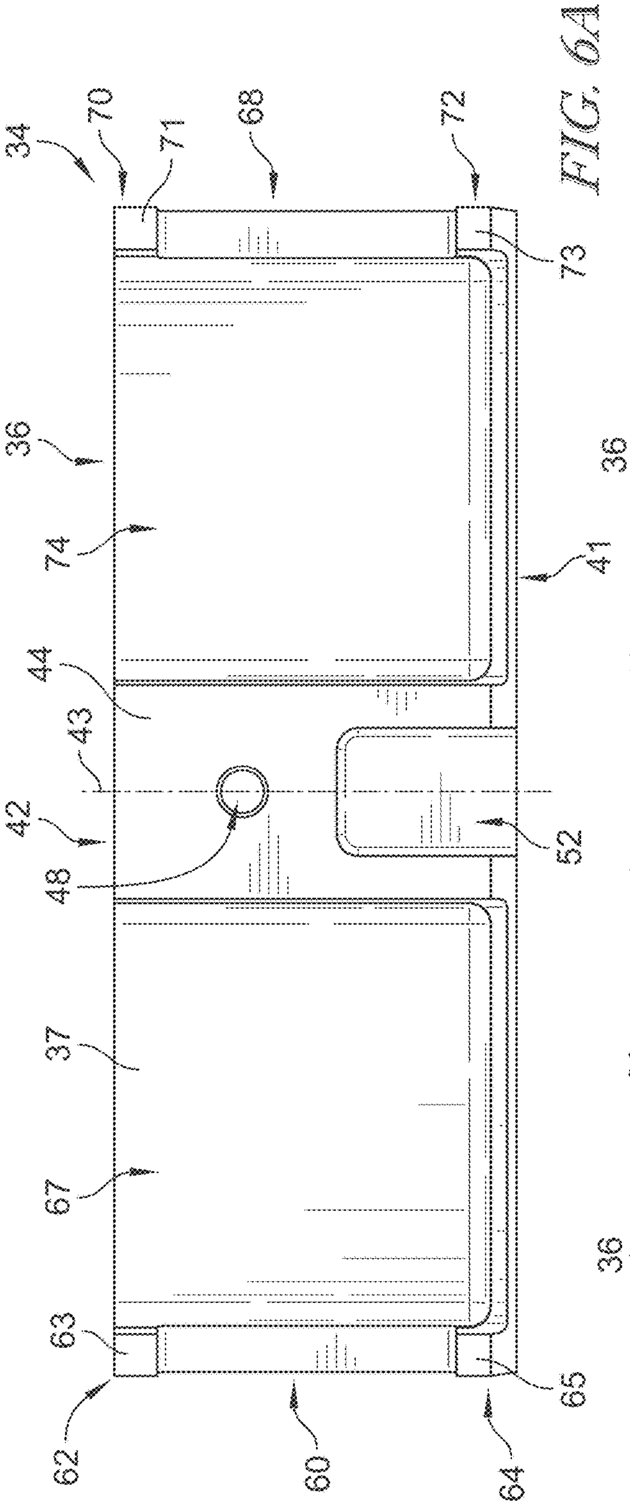
FIG. 6A is a top view of the locating plate of the turbine shroud assembly of FIG. 2A.
Figure 6B:
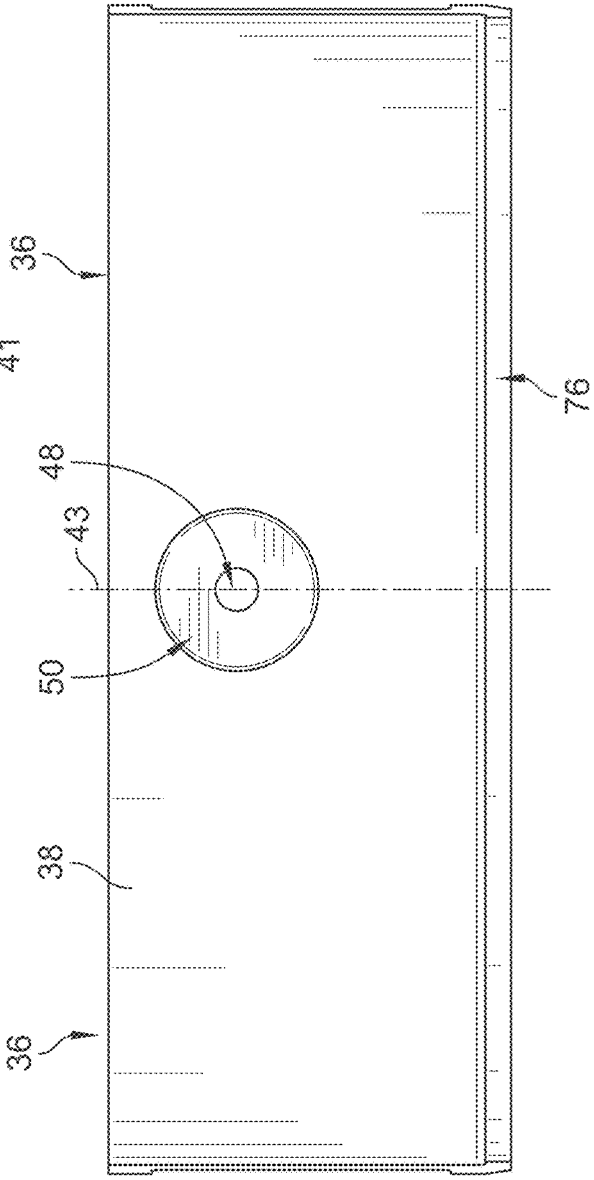
FIG. 6B is a bottom view of the locating plate of the turbine shroud assembly of FIG. 2A.
Figure 7B:
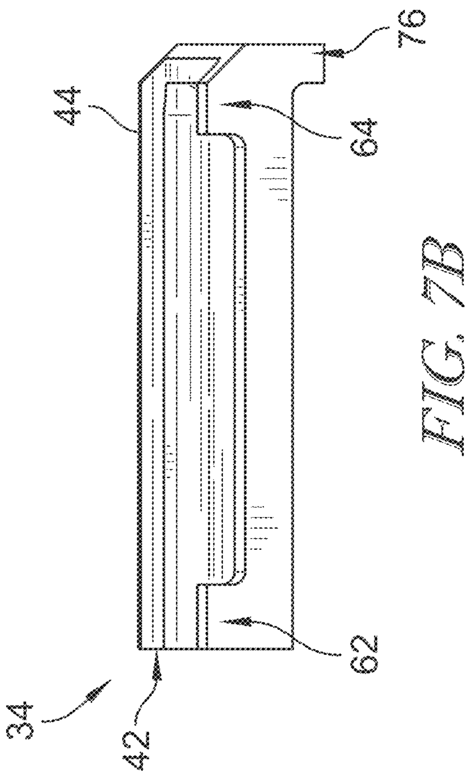
FIG. 7B is a side view opposite the side view of FIG. 7A showing the locating plate of the turbine shroud assembly of FIG. 2A.
Figure 7A:
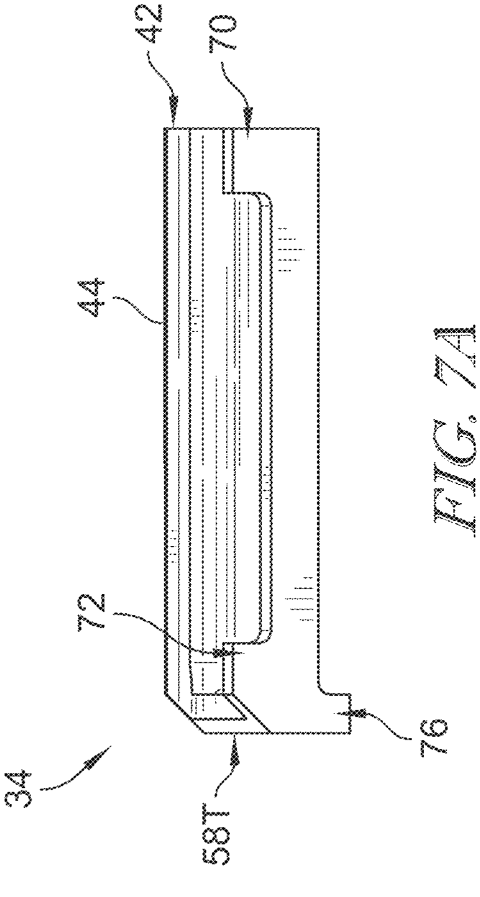
FIG. 7A is a side view of the locating plate of the turbine shroud assembly of FIG. 2A.
Figure 7C:
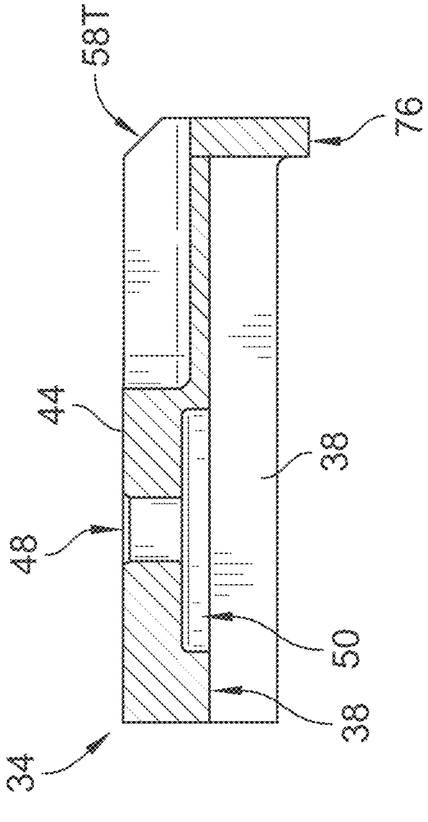
FIG. 7C is a side cross-sectional view of the side view of FIG. 7A showing the locating plate of the turbine shroud assembly of FIG. 2A, and showing the recess formed in the lower surface of the main wall, the hole for the fastener, and the recess formed in the raised portion.

As shown in detail in FIGS. 3A, 5A, and 6A, the raised portion 42 may further includes a recess 52 formed therein. The recess 52 may open out of an axially aft side 41A of the main wall 36 and extend partially axially forward into the raised portion 42. In some embodiments, the recess 52 terminates axially aft of the hole 48.

The locating plate 34 may further include a first axially aft ledge 56 extending upwardly away from the main wall upper surface 37, as shown in detail in FIG. 3A. The first axially aft ledge 56 may connect to the raised portion 42 and extend circumferentially away from the raised portion 42 and connect to a first circumferential ledge 60 located on the first circumferential side 39 of the main wall 36. Similarly, the locating plate 34 may further include a second axially aft ledge 58 extending upwardly away from the main wall upper surface 37. The second axially aft ledge 58 may connect to the raised portion 42 and extend circumferentially away from the raised portion 42 and connect to a second circumferential ledge 68 located on the second circumferential side 40 of the main wall 36.

Each of the first and second axially aft ledges 56, 58 may include a tapered axially aft portion 56T, 58T. Each of the first and second axially aft ledges 56, 58 may include fillets 56F, 58F that extend into the main wall upper surface 37 and connect to the fillets 45, 46 of the raised portion 42, as shown in FIG. 3B. In some embodiments, a lip 76 extends downwardly away from the main wall bottom surface 38 on the axially aft side 41A of the main wall 36 and is flush with the first and second axially aft ledges 56, 58, as shown in FIGS. 3A, 5A, 6B, and FIGS. 7A-7C.

The locating plate 34 further includes the first and second circumferential ledges 60, 68 arranged on the first and second circumferential sides 39, 40 of the main wall 36, as shown in FIGS. 2B-5A, 6A, 7A, and 7B. Each of the first and second circumferential ledges 60, 68 extend upwardly away from the main wall upper surface 37 and also extend axially from the axially aft side 41A of the main wall 36 to an axially forward side 41F of the main wall 36 along the first and second circumferential sides 39, 40.

In some embodiments, the first and second circumferential ledges 60, 68 may include fillets 61, 69 that extend into the main wall upper surface 37 and connect to the fillets 56F, 58F of the first and second axially aft ledges 56, 58, as shown in FIGS. 2B-3B. The first and second circumferential ledges 60, 68 and its fillets 61, 69, the raised portion 42 and its fillets 45, 46, and the first and second axially aft ledges 56, 58 and its fillets 56F, 58F together form cavities 67, 74 in the locating plate 34, as can be seen in detail in FIGS. 2B-3B. The cavities 67, 74 are designed to reduce overall weight of the locating plate 34.

In the illustrative embodiment, the locating plate 34 further includes support extensions 62, 64, 70, 72 extending upwardly away from turbine shroud assembly 124, as shown in FIGS. 2B-5A, 6A, 7A, and 7B. In particular, first and second support extensions 62, 64 are arranged on the first circumferential ledge 60 and extend upwardly therefrom. Similarly, third and fourth support extensions 70, 72 are arranged on the second circumferential ledge 68 and extend upwardly therefrom. Although two support extensions are arranged on the first and second circumferential ledges 60, 68 in the illustrative embodiments, a person skilled in the art will understand that more or fewer than two support extensions may be utilized on the locating plate 34, such as one, three, four, or five support extensions arranged on the first and second circumferential ledges 60, 68.

In some embodiments, the first, second, third, and fourth support extensions 62, 64, 70, 72 are formed as columnar posts, as shown in detail in FIGS. 3A and 3B. Illustratively, the first, second, third, and fourth support extensions 62, 64, 70, 72 are formed as four-sided posts, and the axially aft side 64T, 72T of the axially aftmost support extensions (shown as the second and fourth support extensions 64, 72) is tapered.

As shown in 2B-5A, 6A, 7A, and 7B, the first and second support extensions 62, 64 are axially spaced apart from each other, and similarly the third and fourth support extensions 70, 72 are axially spaced apart from each other. In some embodiments, the first and third support extensions 62, 70 are arranged on an axially forwardmost end of the circumferential ledges 60, 68, and the second and fourth support extensions 64, 72 are arranged on an axially aftmost end of the circumferential ledges 60, 68.

Illustratively, the raised portion 42 is positioned on the main wall upper surface 37 circumferentially between the first and second support extensions 62, 64 and the third and fourth support extensions 70, 72. Specifically, the raised portion 42 is located centrally on the main wall 36, being divided in half by the central, axially extending axis 43, as shown in FIG. 2B. As such, the first and second support extensions 62, 64 and the third and fourth support extensions 70, 72 are located equidistant from the axis 43.

Illustratively, the locating plate 34 and its components are comprised of metallic materials. In some embodiments, at least the main wall 36 of the locating plate 34 is flexible so as to allow some flexion during coupling of the locating plate 34 to the turbine case 23. In other embodiments, the locating plate 34 and all of its components are flexible. In some embodiments, the locating plate 34 and all of its components except for the four support extensions 62, 64, 70, 72 are flexible.

FIG. 4A shows an axially front view of the locating plate 34 prior to coupling to the turbine case 23. As can be seen in FIG. 4A, the first and second support extensions 62, 64 extend upwardly by a radial distance 62H, as measured from the main wall upper surface 37, and the third and fourth support extensions 70, 72 extend upwardly by a radial distance 70H, as measured from the main wall upper surface 37. Illustratively, the radial distances 62H, 70H are equal, although a person skilled in the art will understand that the radial distances 62H, 70H may be different based on the design of the locating plate 34, the carrier segment 26, the turbine case 23, and the other engine 10 components.

As can also be seen in FIG. 4A, the raised portion 42 extends upwardly a radial distance 42H, as measured from the main wall upper surface 37. Illustratively, the radial distance 42H is less than the radial distances 62H, 70H. Accordingly, in this first arrangement of the turbine assembly 24, a gap 42G is formed between the raised portion upper surface 44 and a radially inwardly facing surface 23S of the turbine case 23. Thus, prior to coupling of the locating plate 34 to the turbine case 23, the four support extensions 62, 64, 70, 72 are in contact with the radially inwardly facing surface 23S of the turbine case 23, while the raised portion upper surface 44 is not in contact with the radially inwardly facing surface 23S. In some embodiments, the turbine case 23 extends circumferentially around the carrier segment 26 and the locating plate 34 and is arranged radially outwardly of the carrier segment 26 and the locating plate 34.

As can be seen in FIG. 4B, which shows a second arrangement of the turbine assembly 124, the raised portion is coupled to the turbine case 23 via at least one fastener 90 extending through a hole 92 formed in the turbine case 23 and into the hole 48 of the raised portion 42. The fastener 90 may be a bolt configured to engage with threads of the holes 48, 92 and may include a nut 94 so as to couple the locating plate 34 to the turbine case 23. Due to the locating plate 34 being flexible, as the fastener 90 is tightened, the raised portion upper surface 44 is pulled toward the turbine case 23 and eventually into contact with the radially inwardly facing surface 23S of the turbine case 23. Because the four support extensions 62, 64, 70, 72 are already contacting the turbine case 23 and the locating plate 34 is pulled into even further contact with the turbine case 23 via the tightening of the fastener 90, secure contact of all four support extensions 62, 64, 70, 72 with the radially inwardly facing surface 23S of the turbine case 23 can be assured, even if imperfections exist in the support extensions 62, 64, 70, 72. Moreover, the contact between the raised portion 42 and the support extensions 62, 64, 70, 72 with the turbine case 23 dampens vibrations of the locating plate 34.

Moreover, as can be seen in FIG. 2A, under normal operating conditions in which the carrier segment 26 does not move or only moves axially aft, the locating plate 34 does not contact the carrier segment 26. In the event that forces cause the carrier segment 26 to move axially forward, the locating plate 34 will block axially forward movement of the carrier segment 26. Additionally, the locating plate 34 will prevent separation of the hangers 28A, 28B of the carrier segment 26 from the hooks 23A, 23B of the turbine case 23.

Another embodiment of a turbine assembly 124 for use with the gas turbine engine 10 is shown in FIGS. 8-9D. The turbine assembly 124 is similar to the turbine assembly 24 shown in FIGS. 2A-7C, and described herein. Accordingly, similar reference numbers in the 100 series indicate features that are common between the turbine assembly 124 and the turbine assembly 24. The description of the turbine assembly 24 is incorporated by reference to apply to the turbine assembly 124, except in instances when it conflicts with the specific description and the drawings of the turbine assembly 124.

Similar to the turbine assembly 24 described above, the turbine assembly 124 includes a locating plate 134 for coupling to the turbine case 23 which is similar to the locating plate 34, as shown in FIGS. 8-9D. Unlike the locating plate 34, the locating plate 134 of this embodiment does not include support extensions. Instead, the first and second circumferential ledges 160, 168 extend upwardly further than the first and second circumferential ledges 60, 68 described above, and also each include a seal 162, 170.

Specifically, the first and second circumferential ledges 160, 168 extend from the axially forward side 141F of the main wall 136 to the axially aft side 141A of the main wall 136, as shown in FIG. 8. In other words, the first and second circumferential ledges 160, 168 extend from the axially forward side 141F of the main wall 136 and connect to the first and second axially aft ledges 156, 158. Accordingly, each of the first and second circumferential ledges 160, 168 includes an upper surface 161, 169 extending along a top side of the axially extending first and second circumferential ledges 160, 168 from the axially forward side 141F to the axially aft side 141A. Each upper surface 161, 169 includes a groove 163, 171 formed therein that extends along a length of the upper surface 161, 169 for receiving the seals 162, 170. In some embodiments, the upper surfaces 161, 169 may be planar and flat, and in other embodiments, the upper surfaces 161, 169 may be generally planar and slightly curved to match a contour of turbine case 23.

As shown in FIGS. 8-9D, each of the first and second circumferential ledges 160, 168 includes a seal 162, 170 arranged within the grooves 163, 171 formed in the upper surface 161, 169. In some embodiments, the seals 162, 170 may be rope seals, although any seal known to a person skilled in the art may be used. The seals 162, 170 are configured to contact the radially inwardly facing surface 23S of the turbine case 23. As can be seen in FIGS. 9C and 9D, the grooves 163, 171 may be formed to be wider or larger than the diameter of the seals 162, 170 to allow compression of the seals 162, 170 when the locating plate 134 is coupled to the turbine case 23 (see FIG. 9B).

Figure 9A:
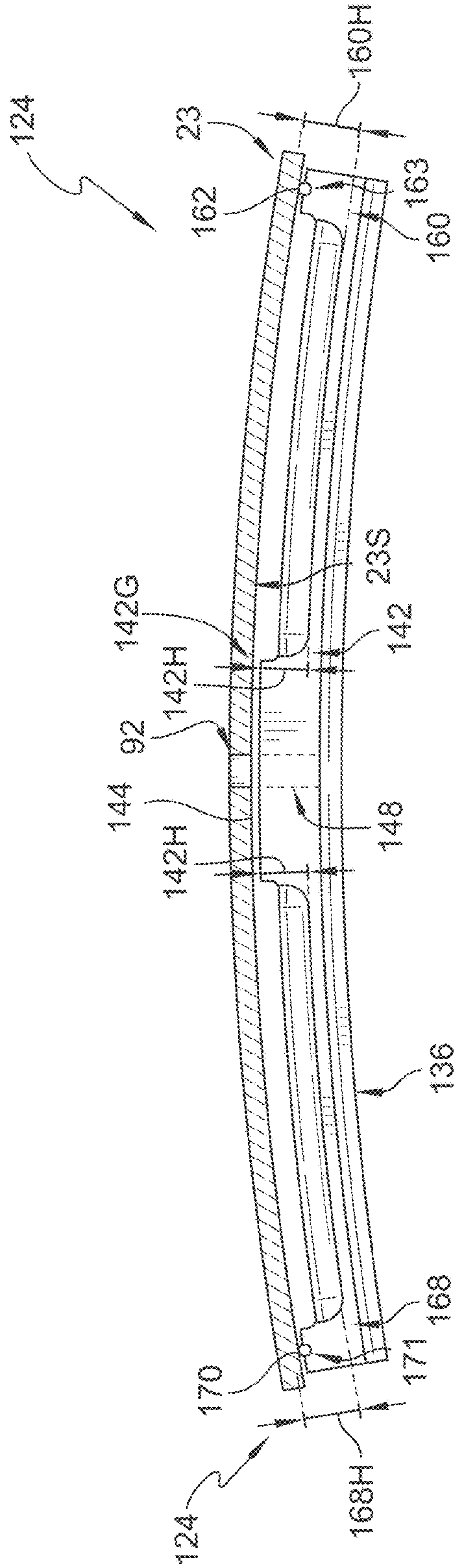
FIG. 9A is a front view of the locating plate of the turbine shroud assembly of FIG. 8 prior to coupling to an turbine case via a fastener, showing the two seals arranged on the support extensions in contact with a radially inwardly facing surface of the turbine case and showing the raised portion slightly spaced apart from the radially inwardly facing surface of the turbine case.
Figure 9B:
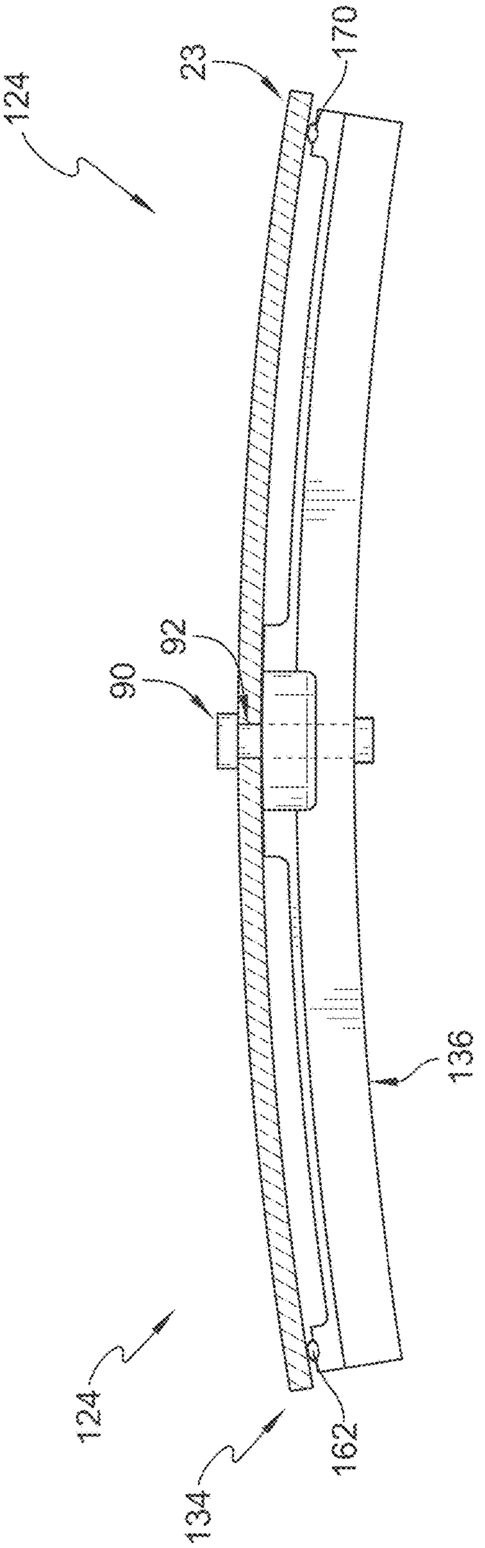
FIG. 9B is an aft view of the locating plate of the turbine shroud assembly of FIG. 8 after coupling to the turbine case via the fastener, showing the two seals arranged on the support extensions in contact with the radially inwardly facing surface of the turbine case and showing the raised portion in contact with the radially inwardly facing surface of the turbine case due tightening of the fastener.
Figure 9D:
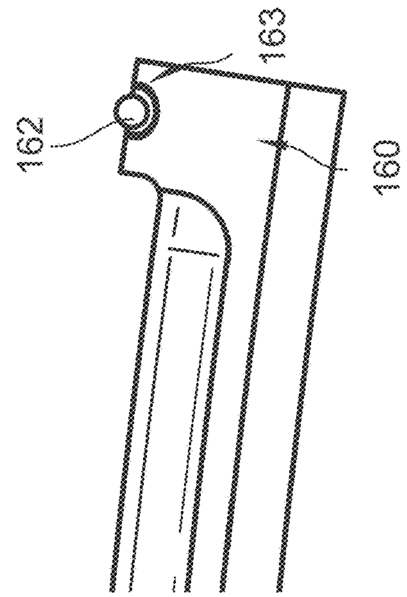
FIG. 9D is a magnified view of the locating plate of FIG. 8, showing that the groove may be formed to be larger than the seal to allow for compression of the seal.
Figure 9C:
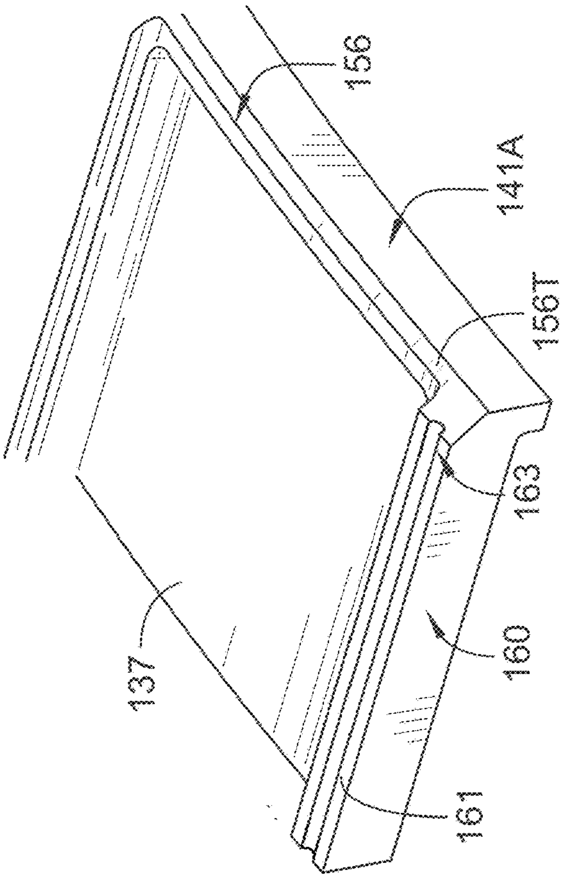
FIG. 9C is a magnified view of the locating plate of FIG. 8, showing the groove formed in a circumferential ledge for receiving a seal.

As can be seen in FIGS. 9A and 9B, radial distances 160H, 168H (i.e. radial heights) of the combination of the first and second circumferential ledges 160, 168 and their respective seals 162, 170 are measured between the main wall upper surface 137 and the top of the seals 162, 170. As can also be seen in FIG. 9A, which shows a first arrangement of the turbine assembly 124, the raised portion 142 extends upwardly a radial distance 142H, as measured from the main wall upper surface 137. Illustratively, the radial distance 142H is less than the radial distances 160H, 168H. Accordingly, a gap 142G is formed between the raised portion upper surface 144 and the radially inwardly facing surface 23S of the turbine case 23. Thus, prior to coupling of the locating plate 134 to the turbine case 23, the seals 162, 170 on the first and second circumferential ledges 160, 168 are in contact with the radially inwardly facing surface 23S of the turbine case 23, while the raised portion upper surface 144 is not in contact with the radially inwardly facing surface 23S.

As can be seen in FIG. 9B, which shows a second arrangement of the turbine assembly 124, the raised portion is coupled to the turbine case 23 via the at least one fastener 90. Due to the locating plate 134 being flexible, as the fastener 90 is tightened, the raised portion upper surface 144 is pulled toward the turbine case 23 and eventually into contact with the radially inwardly facing surface 23S of the turbine case 23. Moreover, the seals 162, 170 are compressed, as shown in FIG. 9B.

Because the seals 162, 170 are already contacting the turbine case 23 and the locating plate 134 is pulled into even further contact with the turbine case 23 via the tightening of the fastener 90, secure contact of the seals 162, 170 with the radially inwardly facing surface 23S of the turbine case 23 can be assured. Moreover, the contact between the raised portion 142 and the seals 162, 170 with the turbine case 23 dampens vibrations of the locating plate 134.

Moreover, as can be seen in FIG. 2A, under normal operating conditions in which the carrier segment 26 does not move or only moves axially aft, the locating plate 134 does not contact the carrier segment 26. In the event that forces cause the carrier segment 26 to move axially forward, the locating plate 134 will block axially forward movement of the carrier segment 26. Moreover, the locating plate 134 will prevent separation of the hangers 28A, 28B of the carrier segment 26 from the hooks 23A, 23B of the turbine case 23.

Another embodiment of a turbine assembly 224 for use with the gas turbine engine 10 is shown in FIGS. 10A-13. The turbine assembly 224 is similar to the turbine assemblies 24, 124 shown in FIGS. 2A-9D, and described herein. Accordingly, similar reference numbers in the 200 series indicate features that are common between the turbine assembly 224 and the turbine assemblies 24, 124. The descriptions of the turbine assemblies 24, 124 are incorporated by reference to apply to the turbine assembly 224, except in instances when they conflict with the specific description and the drawings of the turbine assembly 224.

Similar to the turbine assembly 24 described above, the turbine shroud assembly 224 includes a locating plate 234 for coupling to the turbine case 23 which is similar to the locating plate 34, as shown in FIGS. 10A, 10B, 12, and 13. Specifically, the locating plate 234 includes a raised portion 242 and four support extensions 262, 264, 270, 272 similar to the locating plate 34. Additionally, the locating plate 234 includes a first anti-rotation extension 280 extending radially inwardly away from the main wall 236, and a second anti-rotation extension 284 extending radially inwardly away from the main wall 236 and circumferentially spaced apart from the first anti-rotation extension 280 that are configured to prevent circumferential rotation of a vane assembly 288 located radially inwardly of the locating plate 234. A person skilled in the art will understand that the anti-rotation extensions 280, 284 can also apply to a locating plate similar to the locating plates 34, 134 described with reference to FIGS. 2A-9D.

Figure 10A:
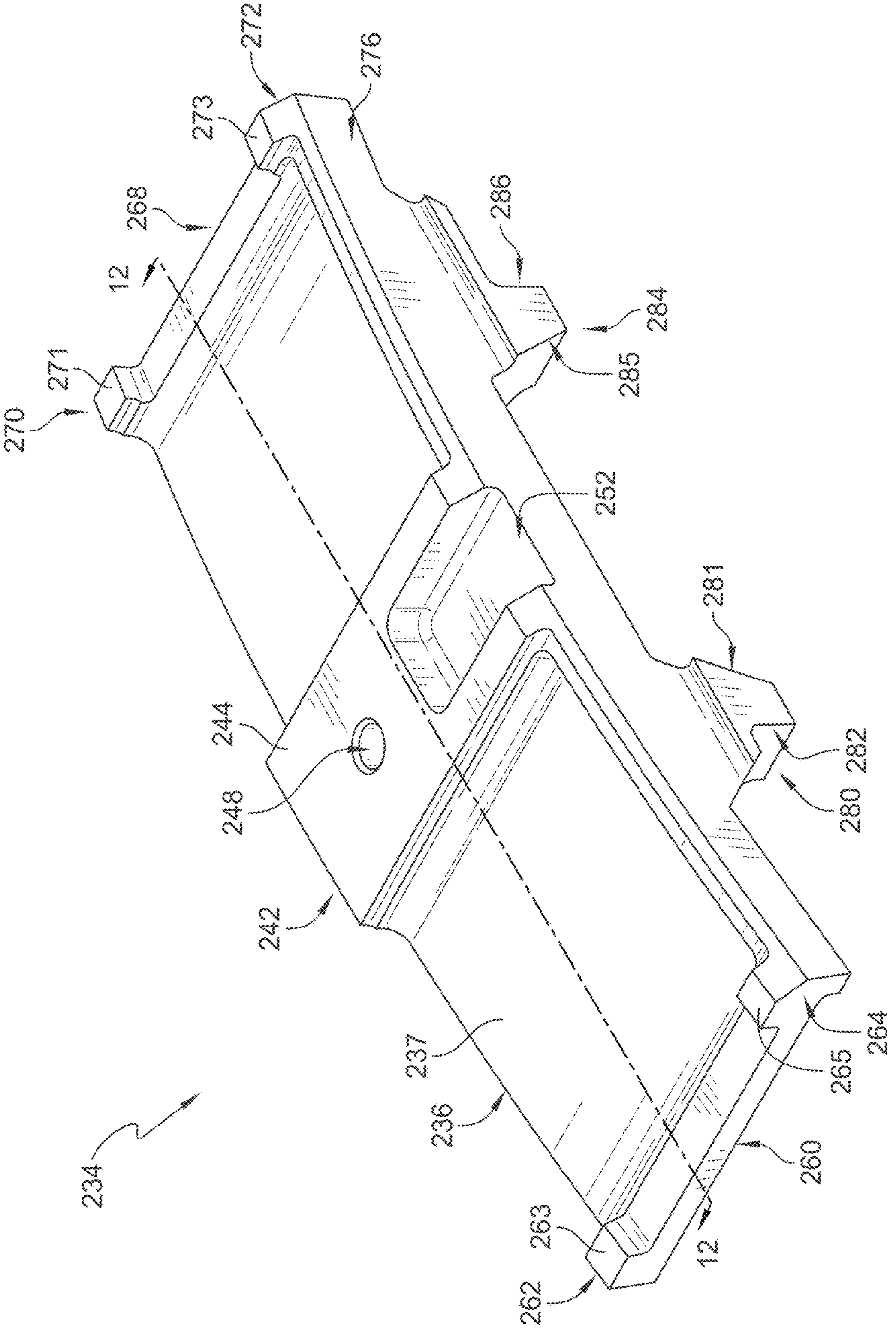
FIG. 10A is a perspective view of a locating plate of a turbine shroud assembly according to a further aspect of the present disclosure, showing that the locating plate includes a main wall having a main wall upper surface, a raised portion extending upwardly away from the main wall upper surface, four support extensions extending upwardly away from the main wall upper surface, and two anti-rotation extensions arranged on an axially aft side of the main wall and configured to prevent circumferential movement of a vane assembly relative to the locating plate.
Figure 10B:
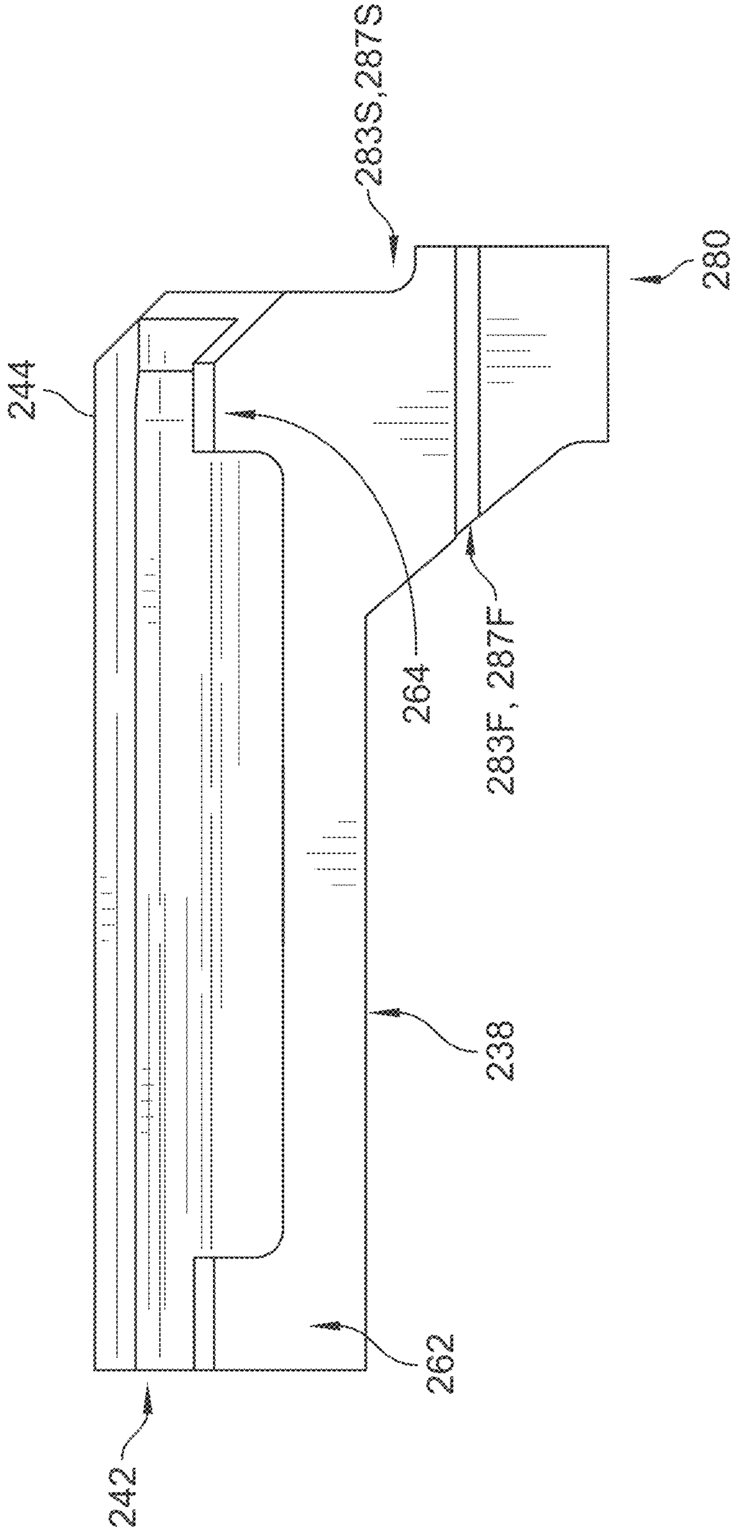
FIG. 10B is a side view of the locating plate of the turbine shroud assembly of FIG. 10A.
Figure 12:
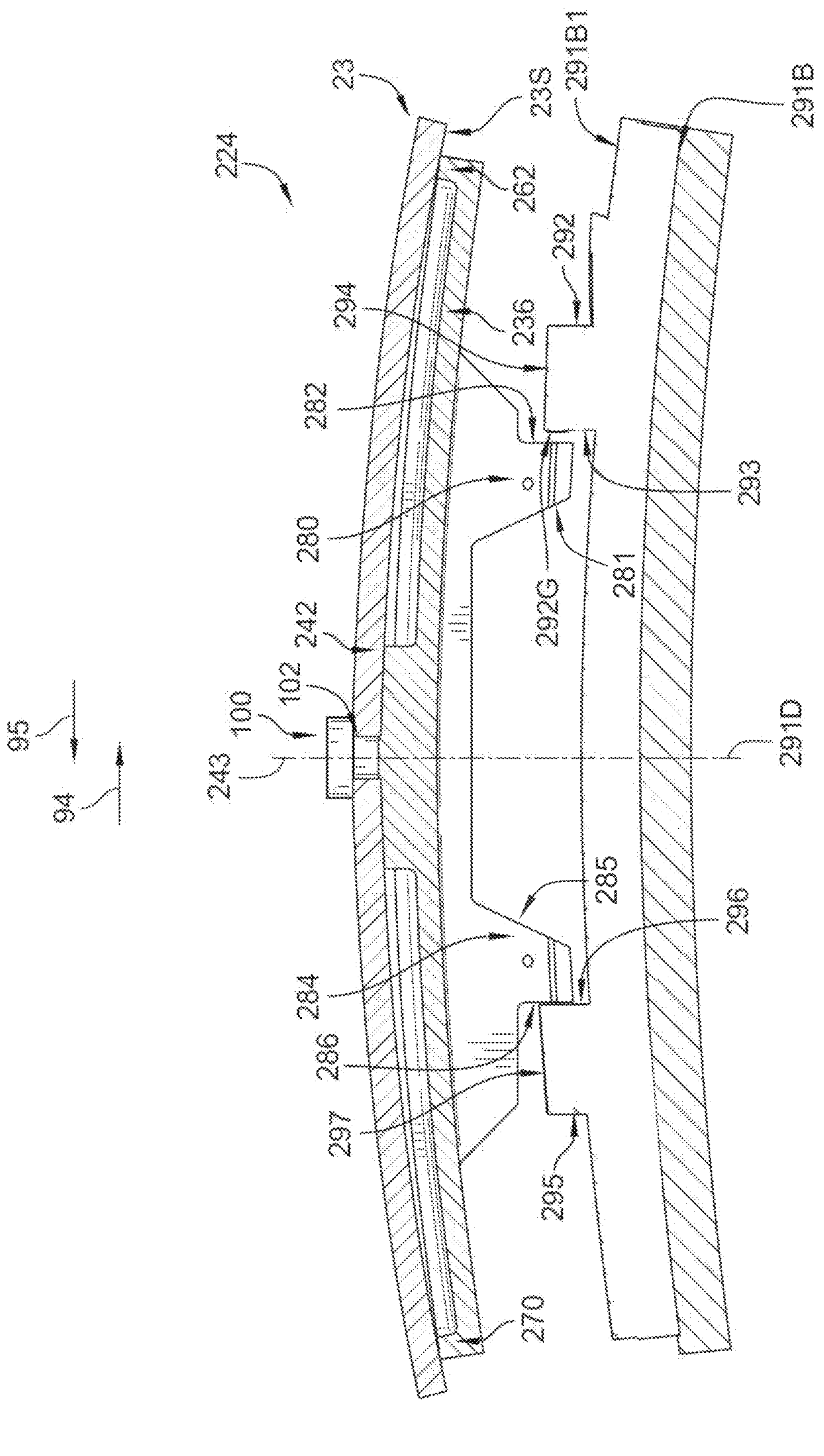
FIG. 12 is a front cross-sectional view of the vane assembly and locating plate of FIGS. 10A and 10B taken through line 12 of FIGS. 10A and 10B, showing the two anti-rotation protrusions and the two anti-rotation extensions being circumferentially spaced apart.

Illustratively, the first anti-rotation extension 280 includes a sloped inner surface 281 and an opposing, first extension surface 282 that faces a first circumferential direction 94, as shown in FIG. 12. The sloped inner surface 281 faces an opposing, second circumferential direction 95. Similarly, the second anti-rotation extension 284 includes a sloped inner surface 285 and an opposing, second extension surface 286 that faces the second circumferential direction 95. The sloped inner surface 285 faces the first circumferential direction 94. The angles of the slopes of the sloped inner surfaces 281, 285 may be the same or different. In some embodiments, the first and second anti-rotation extensions 280, 284 may each include a stepped axially aft surface 283S, 287S and a sloped axially forward surface 283F, 287F, as shown in FIG. 10B.

In some embodiments, as shown in FIG. 12, the first anti-rotation extension 280 is circumferentially spaced apart from the central axis 243 a first distance and the second anti-rotation extension 284 is circumferentially spaced apart from the central axis 243 a second distance. Illustratively, the first distance between the extension 280 and the central axis 243 is different than the second distance between the extension 284 and the central axis 243, although a person skilled in the art will understand that the first and second distances may be equal based on the design of the turbine assembly 224 components.

Figure 11:
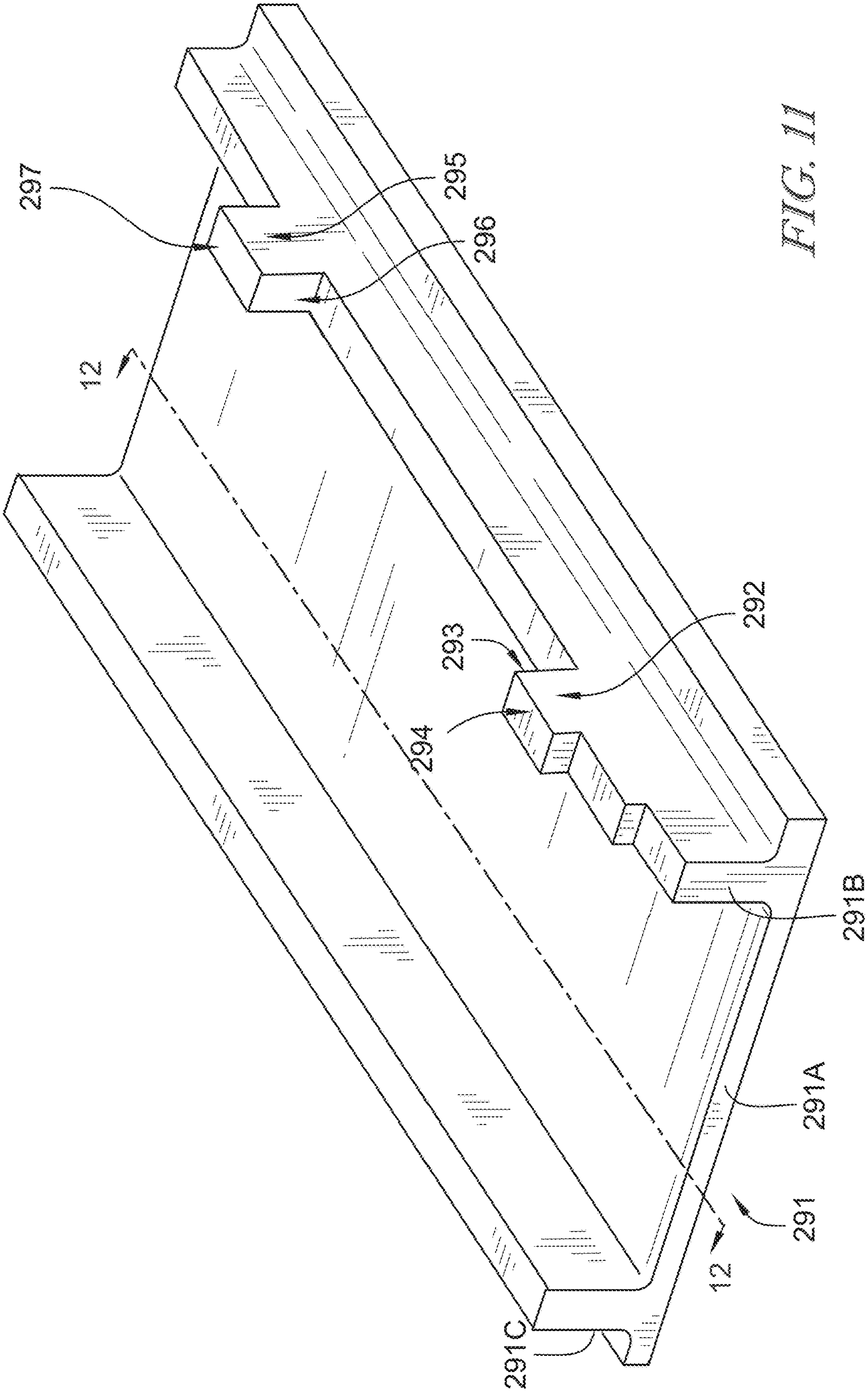
FIG. 11 is a perspective view of an outer platform of the vane assembly of FIG. 10A, showing that the outer platform includes two anti-rotation protrusions configured to engage the two anti-rotation extensions of the locating plate.
Figure 13:
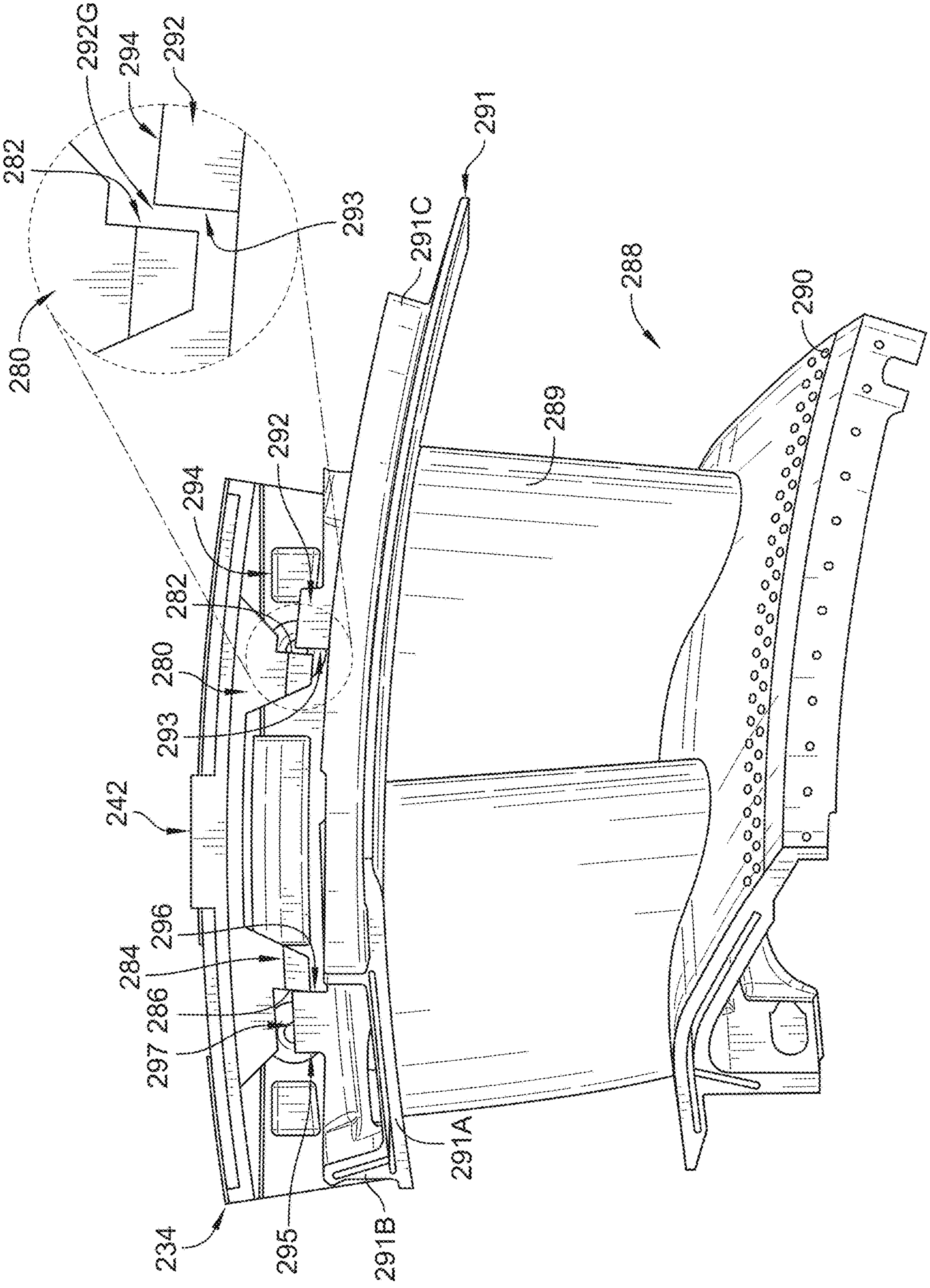
FIG. 13 is a perspective view of the vane assembly and the locating plate of FIG. 12.

As shown in FIGS. 11-13, the turbine assembly 224 further includes the vane assembly 288. Illustratively, the vane assembly 288 extends partway around the axis 11 and is segmented. In the illustrative embodiment, a plurality of vane assemblies 288 each extend circumferentially partway around the axis 11 and cooperate to form a fully annular vane assembly. In other embodiments, the vane assembly 288 may be fully annular and not segmented to extend fully around the axis 11.

The vane assembly 288 includes a plurality of vanes 289 circumferentially spaced apart from each other, as shown in FIG. 13. The vane assembly 288 further includes an inner platform 290 arranged on a radially inner side of the vanes 289, and an outer platform 291 arranged on a radially outer end of the vanes 289. As can be seen in FIGS. 11 and 12, the outer platform 291 includes a main platform 291A, an axially aft flange 291B that extends circumferentially along the main platform 291A, and an axially forward flange 291C that extends circumferentially along the main platform 291A and is axially spaced apart from the axially aft flange 291B. In some embodiments, a central axis 291D of the main platform 291A is aligned with the central axis 243 of the locating plate 234. In some embodiments, the main platform 291A of the outer platform 291 is curved so as to define a fifth radius of curvature, as shown in FIG. 12. In some embodiments, the first, second, third, and fourth radii of curvature are equal to the fifth radius of curvature of the main platform 291A of the outer platform 291.

As can be seen in detail in FIGS. 11-13, the outer platform 291 includes first and second anti-rotation protrusions 292, 295 that extend radially outwardly away from a radially outwardly-facing surface 291B1 of the outer platform 291. Specifically, the anti-rotation protrusions 292, 295 extend radially outwardly away from a top surface 291B1 of the axially aft flange 291B of the outer platform 291, as can be seen in FIG. 11.

Illustratively, the first and second anti-rotation protrusions 292, 295 are formed as block-like structures that extend upwardly from the axially aft flange 291B and are circumferentially spaced apart from each other, as shown in FIGS. 11-13. The first anti-rotation protrusion 292 includes a first protrusion surface 293 that faces the second circumferential direction 295 and the second anti-rotation protrusion 295 includes a second protrusion surface 296 that faces the first circumferential direction 94. Each anti-rotation protrusion 292, 295 also includes a radially outer surface 294, 297 that is radially spaced apart from the anti-rotation extensions 280, 284 of the locating plate 234, as shown in FIG. 12.

Illustratively, the first and second anti-rotation protrusions 292, 295 are circumferentially spaced apart such that they are configured to engage and contact the anti-rotation extensions 280, 284 of the locating plate 234, as shown in FIGS. 12 and 13. Specifically, the first and second protrusion surfaces 293, 296 are configured to engage the first and second extension surfaces 282, 286 of the anti-rotation extensions 280, 284 so as to block circumferential movement of the vane assembly 288 relative to the locating plate 234 in response to circumferential forces acting on the vane assembly 288, as shown in FIG. 12. Specifically, the first extension wall 282 will block circumferential movement of the vane assembly 288 in the second circumferential direction 95, and the second extension wall 286 will block circumferential movement of the vane assembly 288 in the first circumferential direction 94. In this way, circumferential loads can be transferred from the vane assembly 288 to the locating plate 234, and thus to the turbine case 223.

In some embodiments, the first and second anti-rotation protrusions 292, 295 are circumferentially spaced far enough apart such that at least one of the first and second protrusion surfaces 293, 296 is slightly spaced apart from the corresponding extension surface 282, 286 (shown exaggerated in FIGS. 12 and 13). For example, a gap 292G exists between the first protrusion surface 293 and the first extension surface 282, while no gap exists between the second protrusion surface 296 and the second extension surface 286, as shown in FIGS. 12 and 13. In some embodiments, a gap exists between both sets of surfaces 282, 286, 293, 296. The small gap or gaps allow for thermal expansion of the components of the turbine assembly 224 or any other incidental movement of the components. The gap or gaps are small enough to allow an extremely small amount of movement in the event the vane assembly 288 moves circumferentially before being stopped by one of the extension surfaces 282, 286. In some embodiments, no gap exists between either set of surfaces 282, 286, 293, 296 such that no movement or expansion of components is permitted.

A method according to the present disclosure includes a first operational step of arranging a turbine case 23 circumferentially around an axis 11, a second operational step of arranging a turbine shroud assembly 25 including a carrier segment 26 made of metallic materials circumferentially and a blade track segment 30 at least partway around the axis 11 and radially inwardly of the turbine case 23, and a third operational step of coupling the blade track segment 30 to the carrier segment 26.

The method can further include a fourth operational step of coupling the carrier segment 26 to the turbine case 23. The method can further include a fifth operational step of arranging, in a first arrangement, a locating plate 34 with the turbine case 23 axially forward of the carrier segment 26 to block axially forward movement of the carrier segment 26 and prevent separation of the carrier segment 26 from the turbine case 23.

The locating plate includes a main wall 36, a raised portion 42 extending upwardly away from the main wall 36 a first radial distance 62H, 70H, a first support extension 62, 64, 70, 72 extending upwardly away from the main wall 36 a second radial distance 42H and a second support extension 62, 64, 70, 72 circumferentially spaced apart from the first support extension 62, 64, 70, 72 and extending upwardly away from the main wall 36 the second radial distance 42H. The first and second support extensions 62, 64, 70, 72 are circumferentially spaced apart from the raised portion 42. The second radial distance 42H is greater than the first radial distance 62H, 70H such that, in the first arrangement, the first and second support extensions 62, 64, 70, 72 contact the turbine case 23 and the raised portion 42 is spaced apart from the turbine case 23.

The method can further include a sixth operational step of coupling, in a second arrangement, the locating plate 34 to the turbine case 23 such that the first and second support extensions 62, 64, 70, 72 and the raised portion 42 simultaneously contact the turbine case 23 via a fastener 90 extending through the turbine case 23 and the raised portion 42.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine assembly for use with a gas turbine engine, the turbine assembly comprising:

a turbine case arranging circumferentially around an axis, a turbine shroud assembly including a carrier segment made of metallic materials arranged circumferentially at least partway around the axis and radially inwardly of the turbine case and a blade track segment coupled to the carrier segment, the carrier segment being coupled to the turbine case to define a portion of a gas path of the turbine assembly, and a locating plate arranged circumferentially at least partway around the axis coupled with the turbine case and axially forward of the carrier segment to block axially forward movement of the carrier segment and prevent separation of the carrier segment from the turbine case, the locating plate including a main wall, a raised portion extending upwardly away from the main wall a first radial distance, a first support extension extending upwardly away from the main wall a second radial distance and a second support extension circumferentially spaced apart from the first support extension and extending upwardly away from the main wall the second radial distance, the first and second support extensions being circumferentially spaced apart from the raised portion, wherein the second radial distance is greater than the first radial distance such that, in a first arrangement, the locating plate is arranged such that the first and second support extensions contact the turbine case and the raised portion is spaced apart from the turbine case, and, in a second arrangement, the locating plate is arranged such that the first and second support extensions and the raised portion simultaneously contact the turbine case via a fastener extending through the turbine case and the raised portion so as to dampen vibrations of the locating plate.

2. The turbine assembly of claim 1, wherein the main wall of the locating plate is flexible so as to allow, in the second arrangement, a raised portion upper surface of the raised portion to be pulled toward the engine case and into contact with a radially inwardly facing surface of the turbine case via tightening of the fastener.

3. The turbine assembly of claim 2, wherein the locating plate extends partway circumferentially around the axis and wherein the main wall includes a first circumferential side and second circumferential side circumferentially opposite the first circumferential side.

4. The turbine assembly of claim 3, wherein the first support extension is arranged on the first circumferential side of the main wall of the locating plate and the second support extension arranged on the second circumferential side of the main wall.

5. The turbine assembly of claim 4, wherein the first and second support extensions are formed as columnar posts extending upwardly away from the main wall of the locating plate.

6. The turbine assembly of claim 5, wherein the locating plate further includes a third support extension arranged on the first circumferential side of the main wall of the locating plate and a fourth support extension arranged on the second circumferential side of the main wall, and wherein the third and fourth support extensions are formed as columnar posts extending upwardly away from the main wall of the locating plate.

7. The turbine assembly of claim 6, wherein the first support extension is axially spaced apart from the third support extension and the second support extension is axially spaced apart from the fourth support extension.

8. The turbine assembly of claim 4, wherein the raised portion is positioned on the main wall upper surface of the main wall of the locating plate circumferentially between the first support extension and the second support extension, and wherein the raised portion is positioned centrally on the main wall of the locating plate relative to a circumferential direction.

9. The turbine assembly of claim 4, wherein the first and second support extensions are formed as axially extending ledges that extend axially from an axially forward side of the main wall to an axially aft side of the mail main wall, and wherein the first and second support extensions each include an upper surface extending along a top side of the axially extending ledges from the axially forward side to the axially aft side that matches a contour of the turbine case.

10. The turbine assembly of claim 9, further comprising:

a first seal arranged in a first groove formed in the upper surface of the first support extension; and a second seal arranged in a second groove formed in the upper surface of the second support extension.

11. The turbine assembly of claim 1, wherein, in the second arrangement, the locating plate is spaced apart from the carrier segment such that, in response to the carrier segment being forced axially forward, the carrier segment contacts the locating plate and the locating plate prevents further axially forward movement of the carrier segment.

12. The turbine assembly of claim 11, wherein the carrier segment further includes a first hanger that couples to a first hook arranged on the turbine case, and wherein the locating plate prevents separation of the first hanger from the first hook.

13. A turbine assembly for use with a gas turbine engine, the turbine assembly comprising:

a turbine case arranging circumferentially around an axis, a turbine shroud assembly including a carrier segment arranged radially inwardly of the turbine case and coupled to the turbine case, and a locating plate coupled with the turbine case axially forward of the carrier segment to block axially forward movement of the carrier segment and prevent separation of the carrier segment from the turbine case, the locating plate including a main wall, a raised portion extending upwardly away from the main wall, a first support extension extending upwardly away from the main wall a second radial distance and a second support extension circumferentially spaced apart from the first support extension and extending upwardly away from the main wall the second radial distance, wherein the second radial distance is greater than the first radial distance and the first and second support extensions and the raised portion simultaneously contact the turbine case via a fastener extending through the turbine case and the raised portion so as to dampen vibrations of the locating plate.

14. The turbine assembly of claim 13, wherein the locating plate extends partway circumferentially around the axis and wherein the main wall includes a first circumferential side and second circumferential side circumferentially opposite the first circumferential side.

15. The turbine assembly of claim 14, wherein the first support extension is arranged on the first circumferential side of the main wall of the locating plate and the second support extension is arranged on the second circumferential side of the main wall.

16. The turbine assembly of claim 15, wherein the raised portion is positioned on the main wall circumferentially between the first support extension and the second support extension, and wherein the raised portion is positioned centrally on the main wall of the locating plate relative to a circumferential direction.

17. A method comprising:

arranging a turbine case circumferentially around an axis, arranging a turbine shroud assembly including a carrier segment made of metallic materials circumferentially at least partway around the axis and radially inwardly of the turbine case, coupling a blade track segment to the carrier segment, coupling the carrier segment to the turbine case, arranging, in a first arrangement, a locating plate with the turbine case axially forward of the carrier segment to block axially forward movement of the carrier segment and prevent separation of the carrier segment from the turbine case, the locating plate including a main wall, a raised portion extending upwardly away from the main wall a first radial distance, a first support extension extending upwardly away from the main wall a second radial distance and a second support extension circumferentially spaced apart from the first support extension and extending upwardly away from the main wall the second radial distance, the first and second support extensions being circumferentially spaced apart from the raised portion, wherein the second radial distance is greater than the first radial distance such that, in the first arrangement, the first and second support extensions contact the turbine case and the raised portion is spaced apart from the turbine case, and coupling, in a second arrangement, the locating plate to the turbine case such that the first and second support extensions and the raised portion simultaneously contact the turbine case via a fastener extending through the turbine case and the raised portion so as to dampen vibrations of the locating plate.

18. The method of claim 17, wherein the main wall of the locating plate is flexible so as to allow, in the second arrangement, a raised portion upper surface of the raised portion to be pulled toward the engine case and into contact with a radially inwardly facing surface of the turbine case via tightening of the fastener.

19. The method of claim 18, wherein the locating plate extends partway circumferentially around the axis and wherein the main wall includes a first circumferential side and second circumferential side circumferentially opposite the first circumferential side, wherein the first support extension is arranged on the first circumferential side of the main wall of the locating plate and the second support extension arranged on the second circumferential side of the main wall, and wherein the first and second support extensions are formed as columnar posts extending upwardly away from the main wall of the locating plate.

20. The method of claim 19, wherein the locating plate further includes a third support extension arranged on the first circumferential side of the main wall of the locating plate and a fourth support extension arranged on the second circumferential side of the main wall, and wherein the third and fourth support extensions are formed as columnar posts extending upwardly away from the main wall of the locating plate.

* * * * *